US011893201B2

(12) United States Patent
Zhang et al.

(10) Patent No.: US 11,893,201 B2
(45) Date of Patent: Feb. 6, 2024

(54) ALWAYS ON DISPLAY THEME DISPLAY METHOD AND MOBILE DEVICE

(71) Applicant: Huawei Technologies Co., Ltd., Shenzhen (CN)

(72) Inventors: Haoping Zhang, Xi'an (CN); Chao Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/793,600

(22) PCT Filed: Jan. 15, 2021

(86) PCT No.: PCT/CN2021/071976
§ 371 (c)(1),
(2) Date: Jul. 18, 2022

(87) PCT Pub. No.: WO2021/143794
PCT Pub. Date: Jul. 22, 2021

(65) Prior Publication Data
US 2023/0067599 A1 Mar. 2, 2023

(30) Foreign Application Priority Data

Jan. 19, 2020 (CN) .......................... 202010060561.6

(51) Int. Cl.
*G06F 3/0481* (2022.01)
(52) U.S. Cl.
CPC .................................. *G06F 3/0481* (2013.01)
(58) Field of Classification Search
CPC ........ G06F 3/0481; G06F 9/445; G06F 9/451; G06F 3/0488; G06F 3/04883; H04M 1/724
See application file for complete search history.

(56) References Cited

U.S. PATENT DOCUMENTS 9,401,130 B2  7/2016 Gunn et al.
11,307,733 B2  4/2022 Luo et al.
(Continued)

FOREIGN PATENT DOCUMENTS

CN  103442139 A  12/2013
CN  105487807 A  4/2016
(Continued)

OTHER PUBLICATIONS

Ghone, P., "How to Fully Customise Any Android Phone In 10 Easy Steps," Jan. 3, 2017 (Jan. 3, 2017), XP093008118, Retrieved from the Internet: URL:https://guide.servify.in/customise-any-android-phone/, 8 pages.
(Continued)

*Primary Examiner* — Phenuel S Salomon
(74) *Attorney, Agent, or Firm* — Slater Matsil, LLP

(57) ABSTRACT

An Always On Display (AOD) theme display method is provided. In the method, when a mobile device is under a screen-on theme, one or more first controls included in the screen-on theme are separately selected on an AOD settings interface based on a detected operation, and one or more second controls are selected on a second control settings interface, where the second control is a lower-level control of the first control, and at least one first control includes the second control. When the mobile device is switched from a screen-on state to an AOD state, a control displayed in an AOD theme is a part of the first controls included in the screen-on theme and/or a part of the second controls. The method meets a user requirement for more refined or personalized settings, so that the AOD theme is consistent with or close to the screen-on theme in style. This improves user experience.

18 Claims, 27 Drawing Sheets

(56) References Cited

U.S. PATENT DOCUMENTS

| | | | |
|---|---|---|---|
| 11,314,898 B2 | 4/2022 | Rhee et al. | |
| 2006/0026527 A1* | 2/2006 | Bells | H04M 1/72448 |
| | | | 715/747 |
| 2011/0010647 A1* | 1/2011 | Ducharme | G06F 3/0481 |
| | | | 715/765 |
| 2016/0349868 A1* | 12/2016 | Kim | G06F 3/0484 |
| 2017/0160898 A1* | 6/2017 | Lee | G06F 3/0418 |
| 2018/0048762 A1 | 2/2018 | Kats et al. | |
| 2018/0121060 A1* | 5/2018 | Jeong | G06F 3/0488 |
| 2018/0279050 A1* | 9/2018 | Ryu | H04R 5/033 |
| 2019/0050045 A1 | 2/2019 | Jha et al. | |
| 2019/0096363 A1* | 3/2019 | Lee | G09G 5/06 |
| 2019/0272086 A1 | 9/2019 | Sun | |
| 2020/0019300 A1 | 1/2020 | Bailey et al. | |
| 2021/0109623 A1* | 4/2021 | Bae | G09G 3/20 |
| 2022/0391161 A1 | 12/2022 | Fan et al. | |

FOREIGN PATENT DOCUMENTS

| | | |
|---|---|---|
| CN | 106412258 A | 2/2017 |
| CN | 106814949 A | 6/2017 |
| CN | 107239785 A | 10/2017 |
| CN | 107632750 A | 1/2018 |
| CN | 107809523 A | 3/2018 |
| CN | 108509119 A | 9/2018 |
| CN | 109857235 A | 6/2019 |
| CN | 110175066 A | 8/2019 |
| CN | 110221898 A | 9/2019 |
| CN | 110381195 A | 10/2019 |
| CN | 110417986 A | 11/2019 |
| WO | 2019206091 A1 | 10/2019 |

OTHER PUBLICATIONS

Science and Technology Theory, MIUI11 off-screen image customization is open for internal testing, free setting with zero threshold, all A-screen systems are available, Oct. 28, 2019, 20 pages (with English Translation).

Westrick, T., "How to Personalize Your Android Phone With Themes and Launchers," XP093008113, Retrieved from the Internet: URL:https://www.howtogeek.com/405455/how-to-personalize-you r-android phone-with-themes-and-launchers/, Mar. 12, 2019 (Mar. 12, 2019), 10 pages.

* cited by examiner

CONT.
FROM

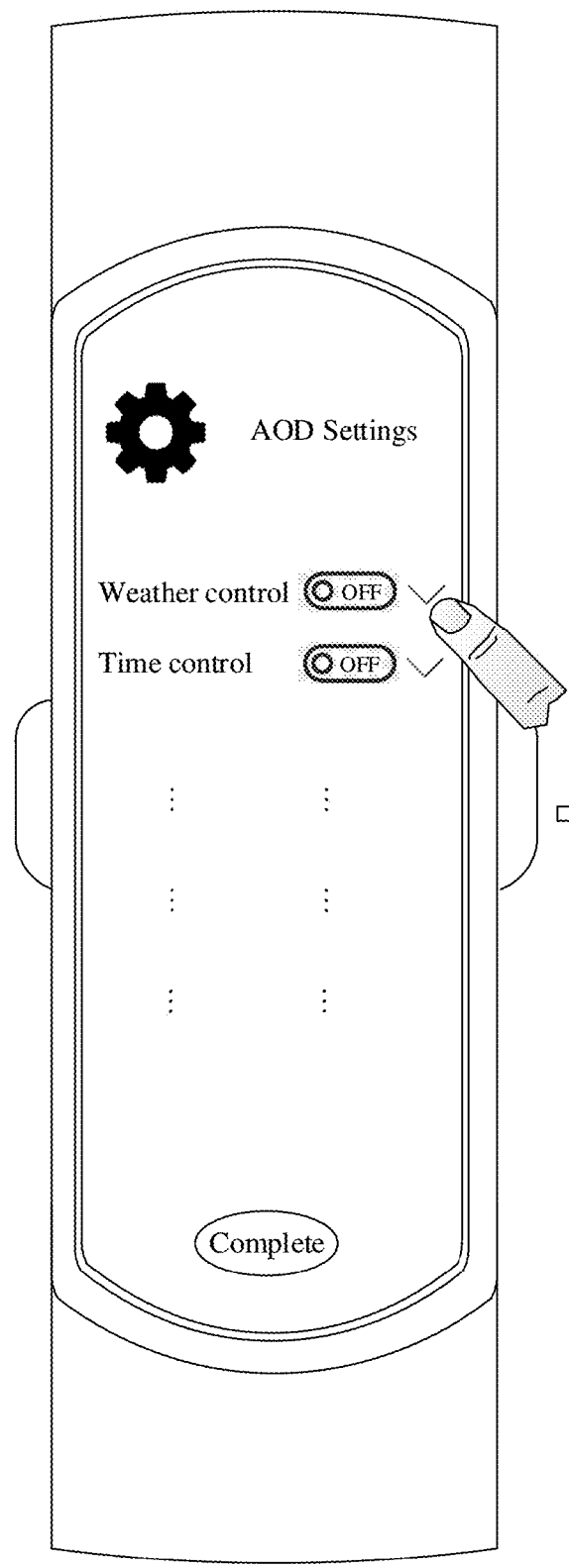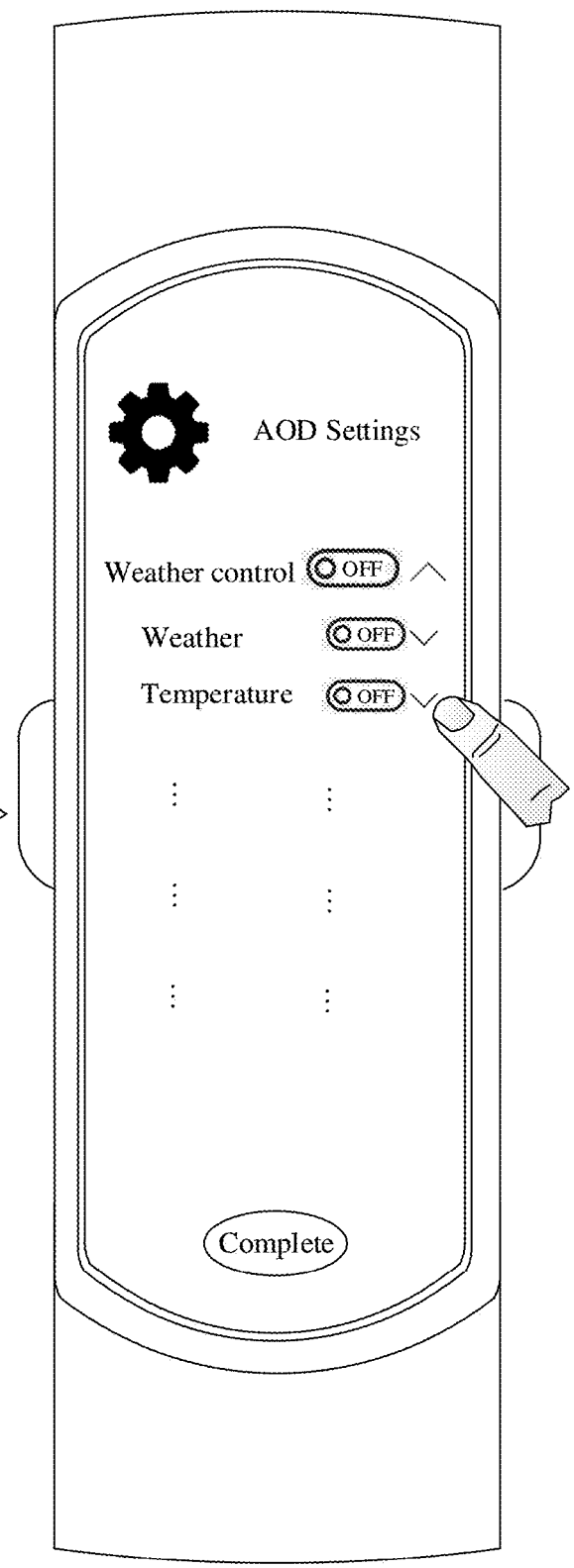
FIG. 10c                     FIG. 10d

US 11,893,201 B2

ALWAYS ON DISPLAY THEME DISPLAY METHOD AND MOBILE DEVICE

CROSS-REFERENCE TO RELATED APPLICATIONS

This application is a National Stage of International Patent Application No. PCT/CN2021/071976, filed on Jan. 15, 2021, which claims priority to Chinese Patent Application No. 202010060561.6, filed on Jan. 19, 2020. Both of the aforementioned applications are hereby incorporated by reference in their entireties.

TECHNICAL FIELD

This application relates to Always On Display technologies, and in particular, to an Always On Display theme display method, a mobile device, a server, and a computer-readable storage medium.

BACKGROUND

Always On Display (Always On Display, AOD for short) technologies enable a user to conveniently and intuitively view related information on a mobile device with screen off, and are widely used. However, an Always On Display theme and a screen-on theme of the mobile device, user interfaces included in both of the foregoing themes, and controls included in the user interfaces all need to be developed and pre-stored by developers of a mobile device vendor or third-party developers. In addition, a large quantity of themes stored on the mobile device may affect storage space. Therefore, an Always On Display theme display method is required.

SUMMARY

An Always On Display theme, also referred to as an AOD theme, has simple settings. Settings of a control display manner are not refined enough, which cannot meet a user requirement for more refined or personalized settings. Consequently, user experience is poor. In addition, after a mobile device receives and applies a new screen-on theme, and when the mobile device switches from the screen-on theme to an AOD theme, the OD theme does not synchronously vary with the screen-on theme. Consequently, the screen-on theme and the AOD theme are inconsistent in style, bringing poor user experience. Therefore, a method for displaying an AOD theme depending on a current screen-on theme and user preferences needs to be provided.

To resolve the foregoing technical problems in the conventional technology, this application provides an AOD theme display method, a mobile device, a server, and a computer-readable storage medium.

According to a first aspect, an Always On Display theme display method is provided. The method is applied to a mobile device, and includes: when the mobile device is under a screen-on theme, detecting a first operation for Always On Display settings; in response to the first operation, entering an Always On Display settings interface, where M first controls and first configuration options that are in a one-to-one correspondence with the M first controls are displayed on the Always On Display settings interface, and M is a positive integer greater than or equal to 1; and first expansion options that are in a one-to-one correspondence with N first controls are further displayed on the Always On Display settings interface, and N is a positive integer greater than or equal to 1 and less than or equal to M; detecting a second operation for the first configuration option; in response to the second operation, selecting at least one first control; detecting a third operation for the first expansion option; in response to the third operation, entering a second control settings interface corresponding to one first control, where P second controls and second configuration options that are in a one-to-one correspondence with the P second controls are displayed on the second control settings interface, and P is a positive integer greater than or equal to 1; detecting a fourth operation for the second configuration option; in response to the fourth operation, selecting at least one second control; and when the mobile device is switched from a screen-on state to an Always On Display state, a control displayed in an Always On Display theme is a part of the first controls and/or a part of the second controls displayed in the screen-on theme. In this way, a user can perform, depending on preferences of the user, more refined deletion settings on the first control included in the current screen-on theme of the mobile device and the second control included in the at least one first control, so that the control included in the AOD theme corresponding to the screen-on theme is a part or all of the first controls and the second controls included in the screen-on theme. Therefore, the user can have more freedom for personalization, and better user experience is provided. In addition, the AOD theme displayed according to this method is consistent with or close to a corresponding screen-on theme in style. This also improves user experience.

According to the first aspect, the screen-on theme is a screen-on theme downloaded from a theme application on the mobile device, or a screen-on theme received from another mobile device, a computer, or a server. This provides different manners for the mobile device to obtain a new screen-on theme. When the current screen-on theme of the mobile device is a new screen-on theme downloaded from a theme application of the mobile device, or a screen-on theme received and obtained from another mobile device, a computer, or a server, the AOD theme is also enabled to be consistent with or close to the corresponding screen-on theme in style. This provides convenience for the user and improves user experience.

According to any one of the first aspect or the implementations of the first aspect, the screen-on theme of the mobile device is pre-stored by a mobile device vendor on the mobile device before delivery. This diversifies manners for the mobile device to obtain a new screen-on theme. When the current screen-on theme of the mobile device is a screen-on theme that is pre-installed or pre-stored on the mobile device, the AOD theme is also enabled to be consistent with or close to the corresponding screen-on theme in style. This provides convenience for the user and improves user experience.

According to any one of the first aspect or the implementations of the first aspect, the method further includes: further displaying, on the second control settings interface, second expansion options that are in a one-to-one correspondence with the P second controls; detecting a fifth operation for the second expansion option; in response to the fifth operation, entering a third control settings interface corresponding to one second control, where Q third controls and third configuration options that are in a one-to-one correspondence with the Q third controls are displayed on the third control settings interface, and Q is a positive integer greater than or equal to 1; detecting a sixth operation for the third configuration option; in response to the sixth operation, selecting at least one third control; and when the mobile device is switched from the screen-on state to the Always On Display state, a control displayed in the Always On Display theme is a part of the first controls, a part of the second controls, and/or a part of the third controls displayed in the screen-on theme. This further clarifies that the user may further set the AOD theme by using an architecture system of controls at three layers. This further provides a more refined setting manner for the user, and more fully meets a refined requirement of the user.

According to any one of the first aspect or the implementations of the first aspect, the control displayed in the Always On Display theme is displayed on a black background. This specifies a display background of the Always On Display theme.

According to any one of the first aspect or the implementations of the first aspect, the mobile device includes but is not limited to a smartwatch, a smart band, and a smartphone. This further specifies a scope of the mobile device.

According to a second aspect, an Always On Display theme generation method is provided. The method is applied to a device, and includes: providing a predetermined defining and setting manner, where the predetermined defining and setting manner includes a defining manner for a first control, an update setting manner for the first control, a defining manner for a second control, an update setting manner for the second control, a setting manner of a filtering rule for the first control, and a setting manner of a filtering rule for the second control; a screen-on theme developed based on the predetermined defining and setting manner is a preset screen-on theme; the screen-on theme includes the first control, the second control, and a first configuration file; and the second control is a lower-level control of the first control; after it is determined that a screen-on theme stored or received by the device belongs to the preset screen-on theme, obtaining a first configuration file of the screen-on theme; parsing the first configuration file to obtain a first control included in the screen-on theme and a second control included in the first control; outputting a prompt for setting a filtering rule for the first control and a filtering rule for the second control; and after it is detected that the filtering rule for the first control and the filtering rule for the second control are set, filtering the first control and the second control according to the specified filtering rule for the first control and the specified filtering rule for the second control, to obtain a filtered first control, a filtered second control, and a second configuration file; and performing adaptability processing on the filtered first control and the filtered second control, to obtain a processed result, and automatically generating a new Always On Display theme based on the processed result and the second configuration file. In this way, developers of a mobile device vendor or third-party developers only need to ensure that a screen-on theme sent to the device is the preset screen-on theme and at least one of the filtering rule for the first control and the filtering rule for the second control is set, and does not need to develop an AOD theme corresponding to the screen-on theme. In addition, according to this method, the AOD theme is consistent with or close to the corresponding screen-on theme in style.

According to the second aspect, the performing adaptability processing on the filtered first control and the filtered second control includes: if at least one of the filtered first control or the filtered second control includes a black pattern or font, and/or includes a pattern or font whose color is similar to black, setting the black pattern or font, and/or the pattern or font whose color is similar to black, to white or another color similar to white, and setting a background color to black, to obtain a processed result. In this way, a preparation is made for normal display of the AOD theme, to adapt to a black background. Finally, the AOD theme is generated and displayed.

According to any one of the second aspect or the implementations of the second aspect, the method further includes: The predetermined defining and setting manner further includes a defining manner for a third control, an update setting manner for the third control, and a setting manner of a filtering rule for the third control. The screen-on theme further includes the third control, and the third control is a lower-level control of the second control. If at least one filtered second control includes the third control, a prompt for setting a filtering rule for the third control is output. After it is detected that the filtering rule for the third control is set, the third control is filtered according to the specified filtering rule for the third control, to obtain a filtered third control and a third configuration file. Adaptability processing is performed on the filtered first control, the filtered second control, and the filtered third control, to obtain a processed result. A new Always On Display theme is automatically generated based on the processed result and the third configuration file. This further clarifies that the developers of the mobile device vendor or the third-party developers may further set the AOD theme by using an architecture system of controls at three layers. This further provides a more refined setting manner for the developers of the mobile device vendor or the third-party developers.

According to any one of the second aspect or the implementations of the second aspect, the device includes a mobile device and a server. The mobile device includes but is not limited to a smartwatch, a smart band, and a smartphone. The server includes but is not limited to a cloud server. This further specifies a scope of the device.

According to a third aspect, a mobile device is provided. The device includes at least a memory, one or more processors, and one or more computer programs. The one or more computer programs are stored in the memory. When the one or more processors execute the one or more computer programs, the mobile device is enabled to implement the Always On Display theme display method according to any one of the first aspect or the implementations of the first aspect, or the mobile device is enabled to implement the Always On Display theme generation method according to any one of the second aspect or the implementations of the second aspect.

In addition, for implementations of the third aspect and corresponding technical effects, refer to the implementations of the first aspect or the implementations of the second aspect and the corresponding technical effects, and any one of the implementations of the first aspect or the implementations of the second aspect and the corresponding technical effects. Details are not described herein again.

According to a fourth aspect, a server is provided. The server includes at least a memory, one or more processors, and one or more computer programs. The one or more computer programs are stored in the memory. When the one or more processors execute the one or more computer programs, the server is enabled to implement the Always On Display theme generation method according to any one of the second aspect or the implementations of the second aspect.

In addition, for implementations of the fourth aspect and corresponding technical effects, refer to the implementations of the second aspect and the corresponding technical effects, and any one of the implementations of the second aspect and the corresponding technical effects. Details are not described herein again.

According to a fifth aspect, a computer-readable storage medium is provided. The computer-readable storage medium includes instructions. When the instructions are run on the mobile device according to the third aspect, the mobile device is enabled to perform the Always On Display theme display method according to any one of the first aspect or the implementations of the first aspect, or the Always On Display theme generation method according to any one of the second aspect and the implementations of the second aspect.

In addition, for implementations of the fifth aspect and corresponding technical effects, refer to the implementations of the first aspect or the implementations of the second aspect and the corresponding technical effects, and any one of the implementations of the first aspect or the implementations of the second aspect and the corresponding technical effects. Details are not described herein again.

According to a sixth aspect, a computer-readable storage medium is provided. The computer-readable storage medium includes instructions. When the instructions are run on the server according to the fourth aspect, the server is enabled to perform the Always On Display theme generation method according to any one of the second aspect and the implementations of the second aspect.

In addition, for implementations of the sixth aspect and corresponding technical effects, refer to the implementations of the second aspect and the corresponding technical effects, and any one of the implementations of the second aspect and the corresponding technical effects. Details are not described herein again.

BRIEF DESCRIPTION OF THE DRAWINGS

To describe the technical solutions in the conventional technology and embodiments of this application more clearly, the following briefly describes the accompanying drawings in the conventional technology and embodiments of this application. It is clear that the accompanying drawings in the following description relate to some embodiments of this application, and a person of ordinary skill in the art may still derive other drawings from these accompanying drawings without creative efforts.

FIG. 9a to FIG. 10d are a schematic diagram of filtering settings for an AOD theme of a smart band in an AOD theme display method according to Embodiment 2 of this application;

FIG. 10a to FIG. 9d are a schematic diagram of filtering setting for an AOD theme of a smart band in an AOD theme display method according to Embodiment 2 of this application;

DETAILED DESCRIPTION OF ILLUSTRATIVE EMBODIMENTS

The following clearly describes the technical solutions in embodiments of this application with reference to the accompanying drawings. It is clear that the described embodiments are merely some but not all of embodiments of this application. All other embodiments obtained by a person of ordinary skill in the art based on embodiments of this application without creative efforts shall fall within the protection scope of this application.

It should be noted that description such as "first", "second" in embodiments of this application is used to distinguish different controls, control filtering rules, defining and setting manners, configuration files, and the like, which neither represents a sequence, nor imposes a limitation that the "first" and the "second" are different types. The description such as "first" and "second" does not limit quantities either. For example, "first control" may be one control, or may be a plurality of controls.

A mobile device having an AOD function pre-stores one or more AOD themes, one or more lock screen themes, and one or more screen-on themes. The AOD theme is for a display after the mobile device is screen-off; the lock screen theme is for a display after the mobile device is screen-locked; and the screen-on theme is for a display after the mobile device is screen-on in an unlocked state. The one or more AOD themes may be in a one-to-one correspondence, a one-to-many correspondence, or a many-to-one correspondence with the one or more screen-on themes. The one or more lock screen themes may be in a one-to-one correspondence, a one-to-many correspondence, or a many-to-one correspondence with the one or more screen-on themes. In addition, the AOD theme and the lock screen theme may be a part of the screen-on theme, or may be obtained by changing a part of the screen-on theme, or may be other content. The AOD theme may be the same as or different from the lock screen theme. The AOD theme may be or may not be a part of the lock screen theme.

Figure 1:
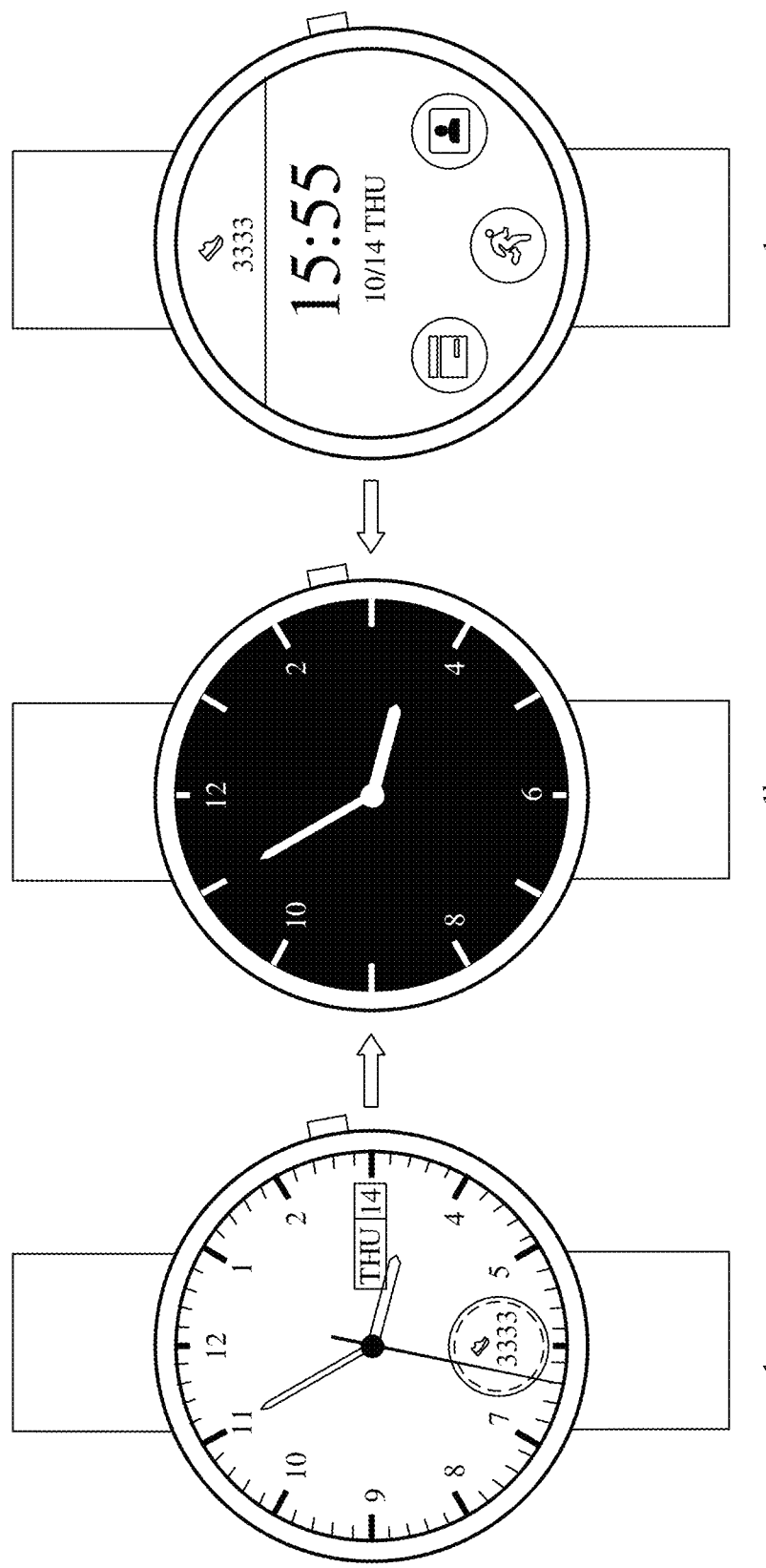
FIG. 1 is a schematic diagram in which a smartwatch switches from a screen-on theme to an AOD theme.
Figure 2:
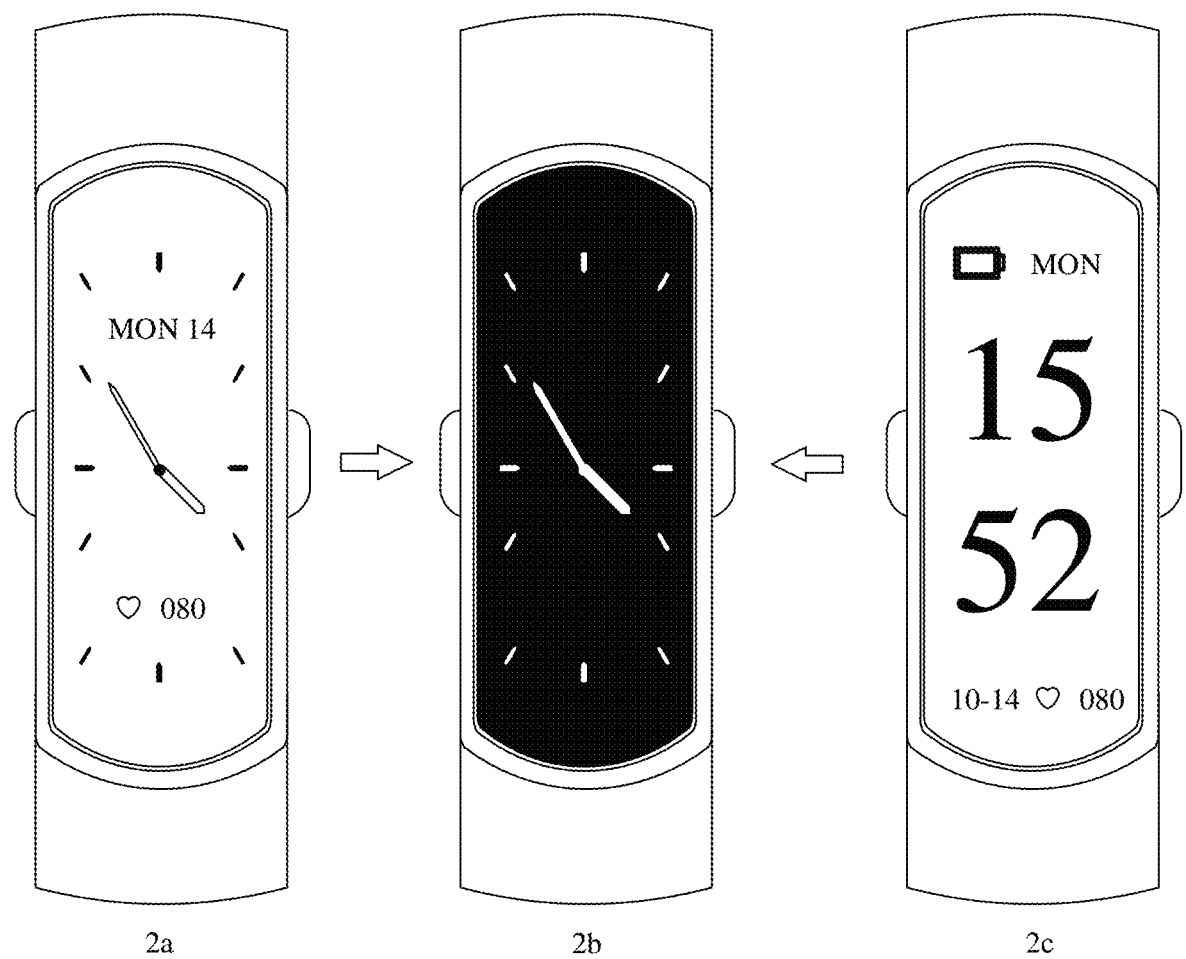
FIG. 2 is a schematic diagram in which a smart band switches from a screen-on theme to an AOD theme.
Figure 3A:
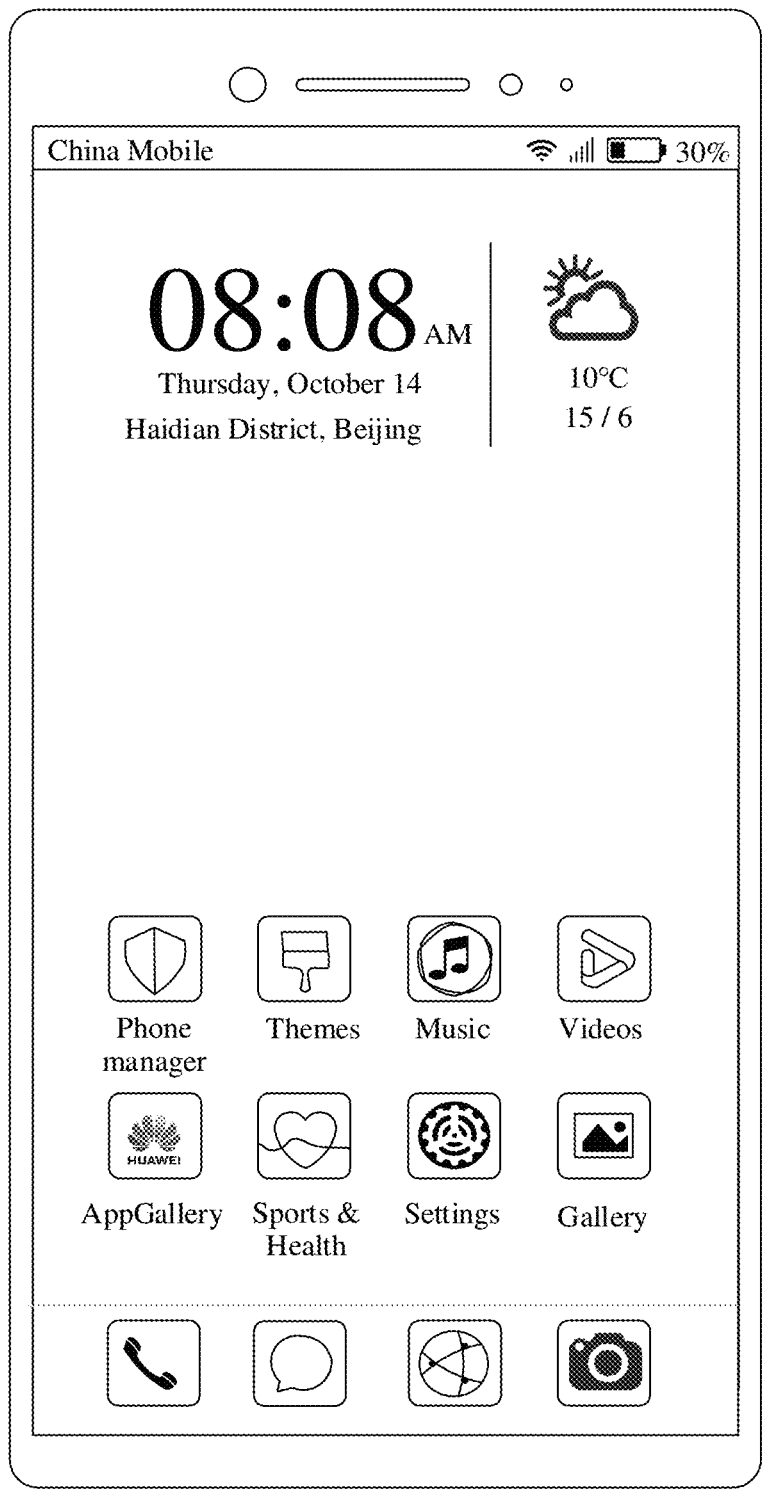
FIG. 3a to FIG. 3d are a schematic diagram in which a smartphone switches from a screen-on theme to an AOD theme.
Figure 3B:
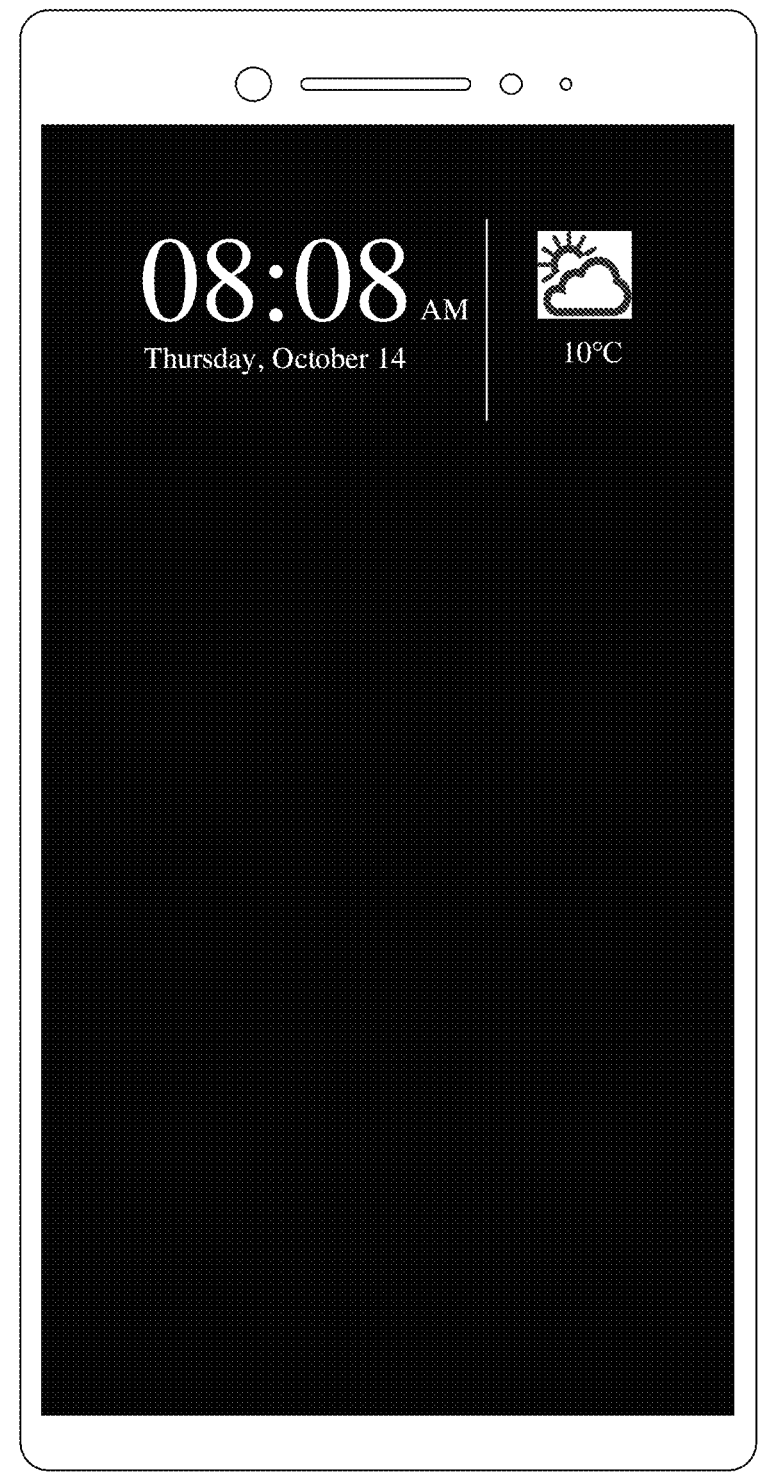

When the mobile device is screen-on in an unlocked state, a user may select a screen-on theme from the one or more pre-stored screen-on themes. Then, the mobile device displays the selected screen-on theme. Next, when the mobile device is in an AOD state, the mobile device displays the AOD theme. There are a plurality of manners for the mobile device to switch from the AOD state to a screen-on state. For example, the mobile device may directly switch from an AOD theme to a screen-on theme. Alternatively, the mobile device may first switch to a lock screen theme from an AOD theme, and then switch to a screen-on theme. The AOD theme, the lock screen theme, and the screen-on theme correspond to each other. Further description is provided with reference to a smartwatch, a smart band, and a smartphone that are separately shown in FIG. 1 to FIG. 3d. 1a in FIG. 1 shows a screen-on theme pre-stored on the smartwatch, and 1b in FIG. 1 shows an AOD theme of the smartwatch. 2a in FIG. 2 shows a screen-on theme pre-stored on the smart band, and 2b in FIG. 2 shows an AOD theme of the smart band. FIG. 3a shows a screen-on theme pre-stored on the smartphone, FIG. 3b shows an AOD theme of the smartphone, and FIG. 3d shows a lock screen theme of the smartphone. Usually, no lock screen theme is set for a smartwatch or a smart band.

However, the AOD theme, the lock screen theme, and the screen-on theme are all developed and pre-stored by developers. Specifically, the AOD theme, the lock screen theme, and the screen-on theme may be developed and pre-stored by developers of a mobile device vendor before delivery, or may be stored after developers of a mobile device vendor release an update version of an operating system or application software of the mobile device and the mobile device updates the new version, or may be pre-stored after third-party developers release a theme in an application store such as a theme application and the mobile device downloads and updates the theme. All these require a large amount of development work of the developers of the mobile device vendor or the third-party developers. In other words, the developers of the mobile device vendor or the third-party developers need to develop two, three, or even more types of themes. In addition, one type of theme includes at least one theme. Each theme relates to different controls. In this way, workload of the developers of the mobile device vendor or the third-party developers is large. Consequently, development costs are high. In addition, a large quantity of themes also occupy large storage space of the mobile device. Therefore, an AOD theme display method needs to be provided for the developers of the mobile device vendor or the third-party developers, so that an AOD theme can be automatically displayed based on the pre-stored screen-on theme, to reduce workload of the developers, reduce development costs, and save storage space of the mobile device.

In addition, the AOD theme has simple settings, cannot provide a more refined setting manner for the user, and cannot meet a user requirement for more refined or personalized settings. Consequently, user experience is poor. In addition, the pre-stored one or more AOD themes may be in a one-to-one correspondence with the pre-stored one or more screen-on themes. In addition, a control included in each AOD theme is a part of controls included in a screen-on theme corresponding to the AOD theme, or is obtained by making an improvement on a part of the controls included in the screen-on theme. In this way, when the mobile device enters the AOD state from the screen-on state, the AOD theme viewed by the user is consistent with or close to the screen-on theme in style. This provides good experience. However, after using the one or more screen-on themes pre-stored on the mobile device for a long time, the user may get bored and seek for a new screen-on theme other than the pre-stored one or more screen-on themes. For example, a new screen-on theme is downloaded from the theme application on the mobile device. After the new screen-on theme is applied to the mobile device, there are changes as the new screen-on theme is used. However, after the mobile device enters the AOD state, the mobile device still displays the pre-stored AOD theme that is previously applied. In this case, the AOD theme is neither consistent with nor close to the new screen-on theme in style. This brings poor user experience.

Further detailed description is provided with reference to FIG. 1 to FIG. 3d. It can be learned from FIG. 1 that the smartwatch applies the pre-stored screen-on theme shown in 1a in FIG. 1. After the smartwatch enters an AOD state from the screen-on state shown in 1a in FIG. 1, an AOD theme of the smartwatch is shown in 1b in FIG. 1. In 1c in FIG. 1, the smartwatch applies a newly downloaded screen-on theme. After the smartwatch enters the AOD state from the screen-on state shown in 1c in FIG. 1, the AOD theme of the smartwatch is still shown in 1b in FIG. 1.

It can be learned from FIG. 2 that the smart band applies the pre-stored screen-on theme shown in 2a in FIG. 2. After the smart band enters an AOD state from the screen-on state shown in 2a in FIG. 2, an AOD theme of the smart band is shown in 2b in FIG. 2. In 2c in FIG. 2, the smart band applies a newly downloaded screen-on theme. After the smart band enters the AOD state from the screen-on state shown in 2c in FIG. 2, the AOD theme of the smart band is still shown in 2b in FIG. 2.

Figures 3B, 3C:
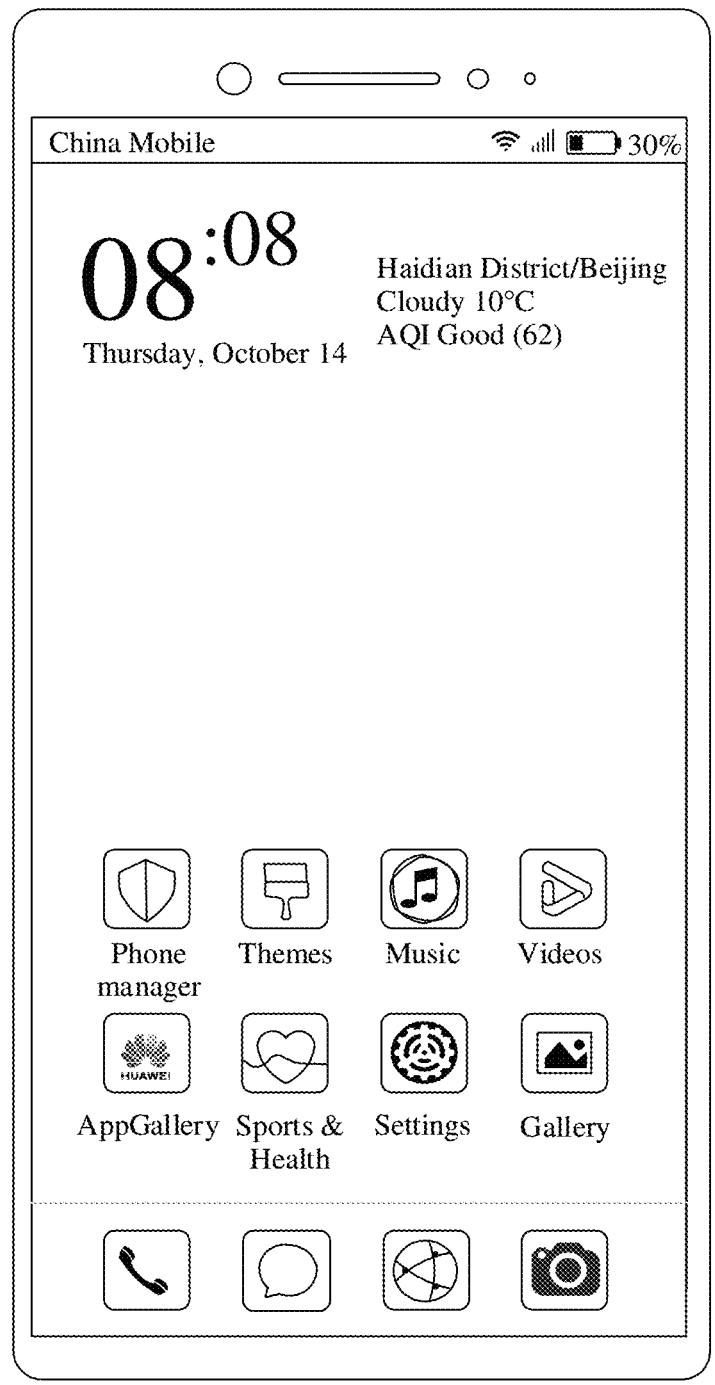
Figure 3D:
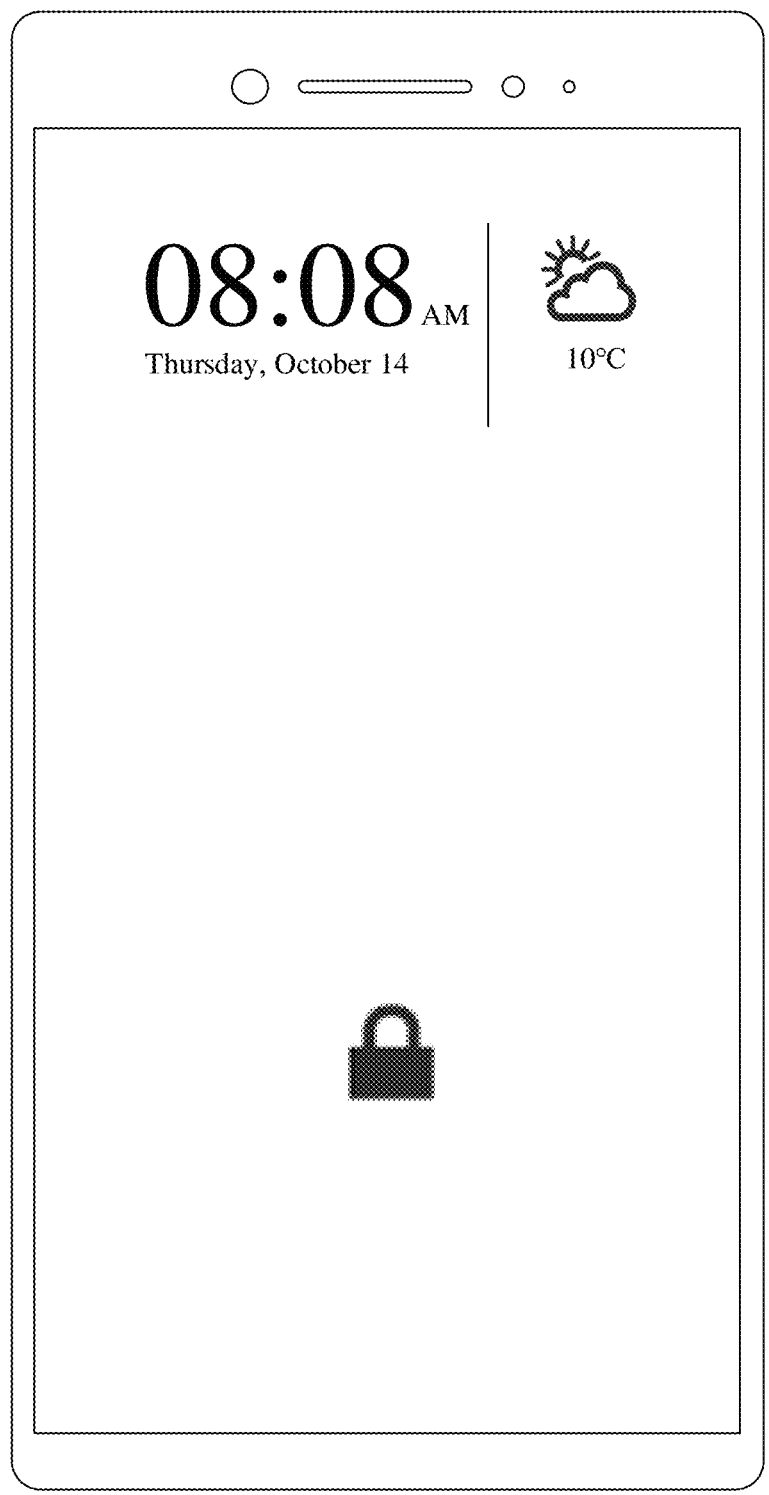

It can be learned from FIG. 3a to FIG. 3d that the smartphone applies the pre-stored screen-on theme shown in FIG. 3a. After the smartphone enters an AOD state from the screen-on on state shown in FIG. 3a, an AOD theme of the smartphone is shown in FIG. 3b. In FIG. 3c, the smartphone applies a newly downloaded screen-on theme. After the smartphone enters the AOD state from the screen-on state shown in FIG. 3c, the AOD theme of the smartphone is still shown in FIG. 3b.

In other words, after the mobile device downloads and applies the new screen-on theme, the AOD theme of the mobile device does not synchronously vary with the new screen-on theme, so that styles cannot be consistent or close. Consequently, user experience is poor. It should be noted that the smartwatch, the smart band, and the smartphone that are separately shown in FIG. 1 to FIG. 3d are merely examples of the mobile device, and are not used to limit a range of the mobile device. This problem also occurs on other types of mobile devices. Therefore, an AOD theme display method needs to be provided for the user, to display an AOD theme depending on a received and applied screen-on theme, so that the AOD theme is consistent with or close to the screen-on theme in style, to provide good user experience.

Figure 4:
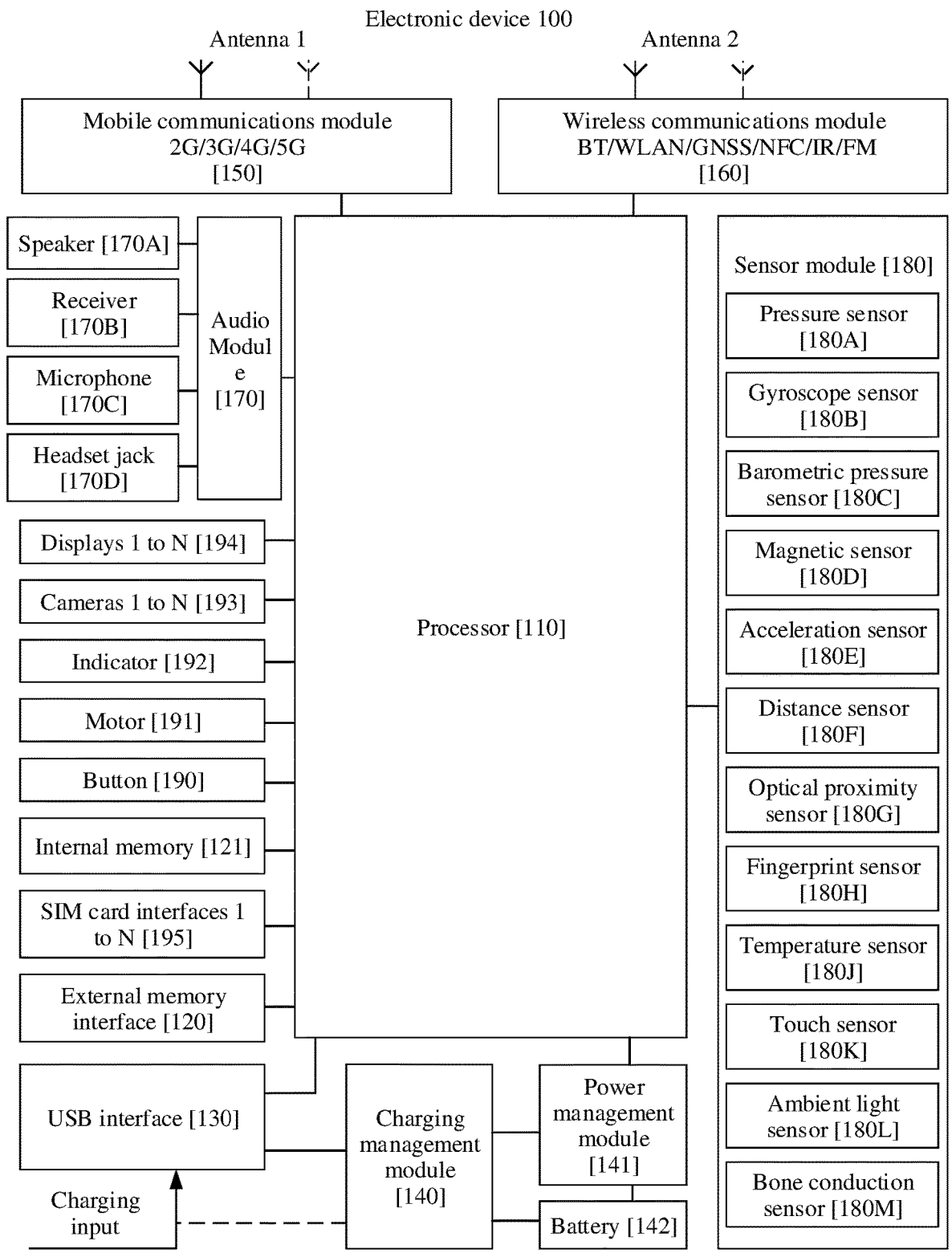
FIG. 4 is a schematic diagram of a structure of a mobile device according to an embodiment of this application.

A method provided in embodiments of this application is applicable to a mobile device 100 shown in FIG. 4. FIG. 4 is a schematic diagram of a structure of the mobile device 100.

The mobile device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the mobile device 100. In some other embodiments of this application, the mobile device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from the charger. The power management module 141 is configured to connect to the battery 142, the charging management module 140, and the processor 110. A wireless communication function of the mobile device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G, 3G, 4G, 5G, or the like and that is applied to the mobile device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the mobile device 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the mobile device 100, the antenna 1 and the mobile communications module 150 are coupled, and the antenna 2 and the wireless communications module 160 are coupled, so that the mobile device 100 can communicate with a network and another device by using a wireless communications technology. The wireless communications technology may include a Global System for Mobile Communications (Global System for Mobile communication, GSM), a general packet radio service (general packet radio service, GPRS), Code Division Multiple Access (Code Division Multiple Access, CDMA), Wideband Code Division Multiple Access (Wideband Code Division Multiple Access, WCDMA), time division-synchronous code division multiple access (time division-synchronous code division multiple access, TD-SCDMA), Long Term Evolution (Long Term Evolution, LTE), BT, a GNSS, Wi-Fi, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite-based augmentation systems (satellite-based augmentation systems, SBAS).

The mobile device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the mobile device 100 may include one or N displays 194, where N is a positive integer greater than 1.

The internal memory 121 may be configured to store computer executable program code, and the executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the mobile device 100 is used. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs the instructions stored in the internal memory 121 and/or the instructions stored in the memory disposed in the processor, to perform various function applications of the mobile device 100 and data processing.

The mobile device 100 may implement an audio function such as music playing or recording by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile device 100 determines pressure strength based on the change of the capacitance. When a touch operation is performed on the display 194, the mobile device 100 detects strength of the touch operation by using the pressure sensor 180A. The mobile device 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is performed. When a touch operation whose touch operation strength is greater than or equal to the first pressure threshold is performed on the icon of Messages, an instruction for creating an SMS message is performed.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the mobile device 100 at a location different from that of the display 194.

Figure 5:
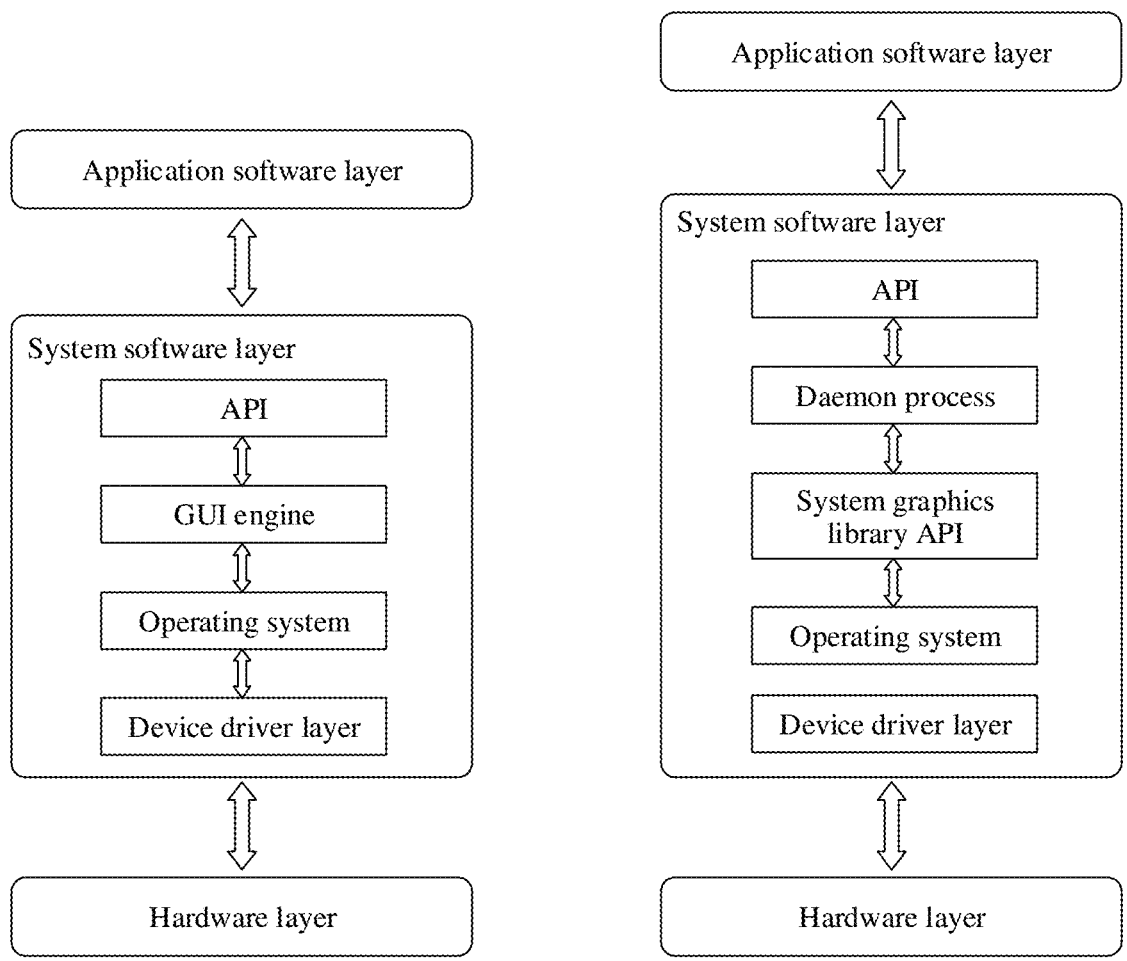
FIG. 5 is a schematic diagram of a software architecture of an AOD theme display method according to an embodiment of this application.

FIG. 5 is a schematic diagram of a software architecture of an AOD theme display method according to an embodiment of this application. 5a and 5b in FIG. 5 show two types of the software architecture in this method. In 5a in FIG. 5, the method is run in a graphical user interface (GUI) engine. The GUI engine is located at a system software layer. An upper layer of the system software layer is an application software layer. A lower layer of the system software layer is a hardware layer. The system software layer includes an application programming interface (API), the GUI engine, an operating system, and a device driver layer. The GUI engine transmits data and/or commands with the application software layer through the API. The GUI engine transmits data and/or commands with the hardware layer by using the operating system and the device driver layer. In 5b in FIG. 5, the method is run in a daemon process. The daemon process is located at a system software layer. A lower layer of the daemon process is a system graphics library API. An upper layer of the daemon process is an API provided to an application software layer. The system software layer includes the API, the daemon process, the system graphics library API, an operating system, and a device driver layer. The daemon process transmits data and/or commands with the application software layer through the API. The daemon process transmits data and/or commands with the hardware layer by using the system graphics library API, the operating system, and the device driver layer. In other words, the method may be run in the GUI engine, or may not be run in the GUI engine.

Embodiment 1

Embodiment 1 of this application provides an AOD theme display method. A setting rule for a screen-on theme and a filtering rule for a control included in the theme are pre-provided for developers of a mobile device vendor or third-party developers, so that the developers of the mobile device vendor or the third-party developers develop a screen-on theme according to the setting rule, and sets, according to the filtering rule, filtering rules for controls at more than two layers that adapt to the developed screen-on theme. In this way, an AOD theme can be displayed depending on the developed screen-on theme and according to the control filtering rules. According to the AOD theme display method, workload of the developers of the mobile device vendor or the third-party developers is reduced, and development costs are reduced. The AOD theme is stored on a server for a user to download. The server may be a cloud server. In addition, less storage space of the mobile device may be occupied.

Before delivery of a mobile device, the developers of the mobile device vendor develop a screen-on theme according to the pre-provided setting rule for the screen-on theme, and pre-store the developed screen-on theme on the mobile device; and set, according to the filtering rule for a control included in the pre-provided theme, a control filtering rule that adapts to the developed screen-on theme, and pre-store the specified control filtering rule on the mobile device. In this way, the AOD theme can be displayed depending on the developed screen-on theme and according to the control filtering rule, and stored on the mobile device. In addition, the developers of the mobile device vendor or the third-party developers develop a screen-on theme according to the pre-provided setting rule for the screen-on theme, and upload the developed screen-on theme to the server; and set, according to the filtering rule for a control included in the pre-provided theme, a control filtering rule that adapts to the developed screen-on theme, and upload the specified control filtering rule to the server. In this way, the AOD theme can be displayed depending on the developed screen-on theme and according to the control filtering rule, and stored on the server for the user to download. The server may be a cloud server. In this way, the developers of the mobile device vendor and the third-party developers need only to develop a screen-on theme and set a control filtering rule corresponding to the developed screen-on theme, and do not need to develop an AOD theme. In some embodiments, the control filtering rule may be a filtering rule for a control at one layer. Alternatively, the control filtering rule may be filtering rules for controls at more than two layers. For brevity, the following provides description by using an example in which the developed screen-on theme includes controls at two layers and corresponding filtering rules for controls at two layers are set. The controls at two layers include a first control and a second control. The filtering rules for controls at two layers include a filtering rule for the first control and a filtering rule for the second control. It should be noted that the controls at two layers and the filtering rules for controls at two layers are merely examples, and do not limit the scope of embodiments of this application.

Figure 6:
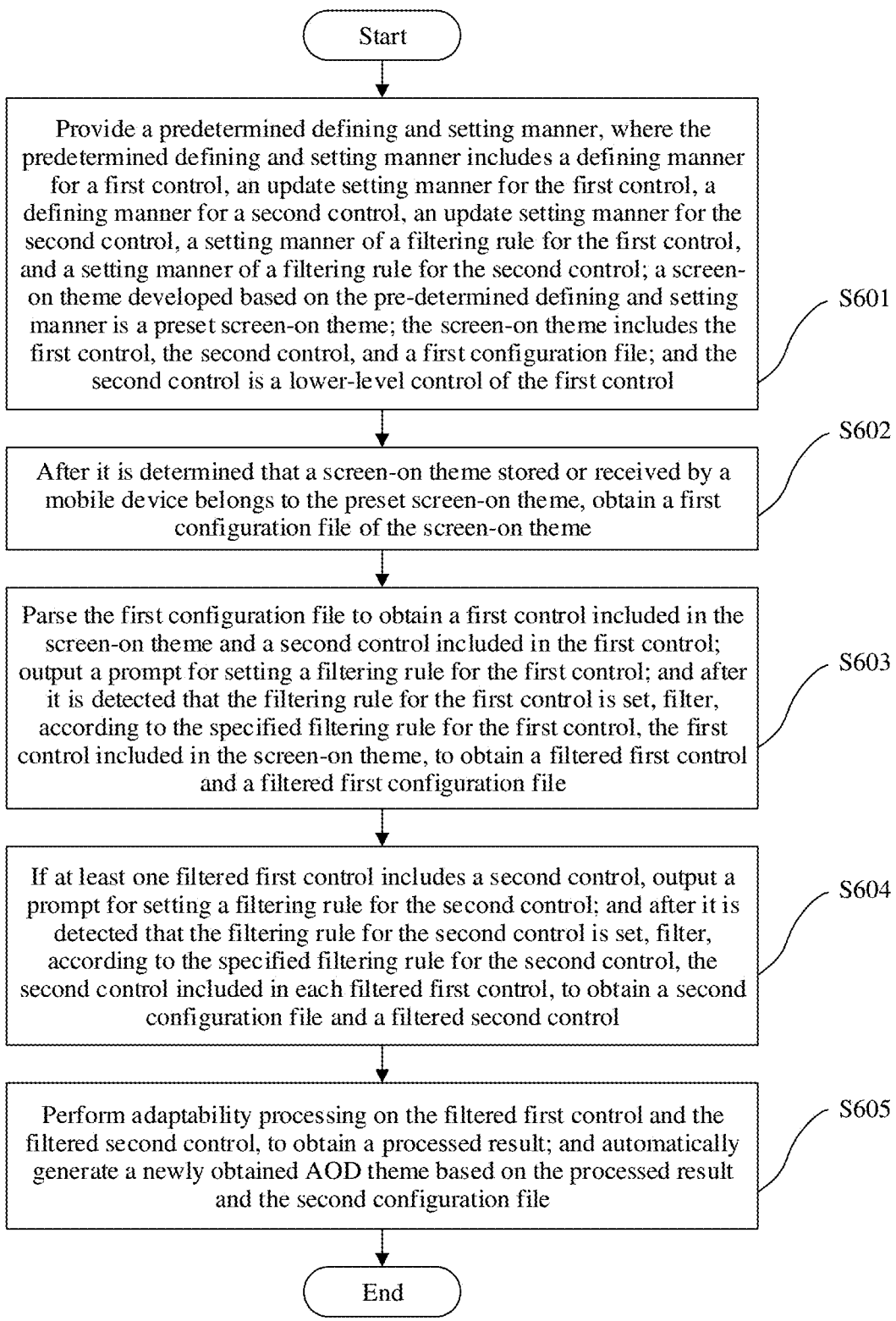
FIG. 6 is a schematic flowchart of an AOD theme display method according to Embodiment 1 of this application.

FIG. 6 is a schematic flowchart of an AOD theme display method according to Embodiment 1 of this application. The method is applied to a device. As shown in FIG. 6, the method includes the following steps. Step S601: Provide a predetermined defining and setting manner, where the predetermined defining and setting manner includes a defining manner for a first control, an update setting manner for the first control, a defining manner for a second control, an update setting manner for the second control, a setting manner of a filtering rule for the first control, and a setting manner of a filtering rule for the second control; a screen-on theme developed based on the predetermined defining and setting manner is a preset screen-on theme; the screen-on theme includes the first control, the second control, and a first configuration file; and the second control is a lower-level control of the first control. The first control is a level-1 control included in the screen-on theme. It should be noted that not each first control includes a second control. Some first controls include second controls, and some first controls do not include second controls. The first configuration file may be placed under a fixed directory. The developed screen-on theme may be pre-stored by developers of a mobile device vendor on a mobile device before delivery, or may be uploaded to a server by developers of a mobile device vendor or third-party developers. Optionally, the update setting manner for the first control and the update setting manner for the second control are set in advance by the developers of the mobile device vendor and cannot be edited or modified. Certainly, in another embodiment, the update setting manner for the first control and the update setting manner for the second control may alternatively be set, edited, or modified by the third-party developers. For example, the third-party developers set an update cycle.

Step S602: After it is determined that a screen-on theme stored or received by the mobile device belongs to the preset screen-on theme, obtain a first configuration file of the screen-on theme. For example, the following steps continue to be performed after it is determined that a screen-on theme stored on the mobile device belongs to the preset screen-on theme, or after it is determined that a screen-on theme downloaded and received by the mobile device from the server belongs to the preset screen-on theme. The following steps do not continue to be performed after it is determined that a screen-on theme stored on the mobile device does not belong to the preset screen-on theme, or after it is determined that a screen-on theme downloaded and received by the mobile device from the server does not belong to the preset screen-on theme.

Step S603: Parse the first configuration file to obtain a first control included in the screen-on theme and a second control included in the first control; output a prompt for setting a filtering rule for the first control; and after it is detected that the filtering rule for the first control is set, filter, according to the specified filtering rule for the first control, the first control included in the screen-on theme, to obtain a filtered first control and a filtered first configuration file. It is not limited that each first control includes a second control. In some embodiments, each first control includes a second control. In some embodiments, only some first controls include second controls. In addition, after viewing the prompt, the developers of the mobile device vendor or the third-party developers set the filtering rule for first control based on the first control and the provided setting manner of the filtering rule for first control. Correspondingly, in step S603, the first configuration file may be stored on the mobile device, or may be stored on the server. In a case in which the first configuration file is stored on the mobile device, when the filtering rule for the first control is set subsequently, the developers of the mobile device vendor store settings of filtering rule for the first control on the mobile device. In a case in which the first configuration file is stored on the server, when the filtering rule for the first control is set subsequently, the developers of the mobile device vendor or the third-party developers store settings of filtering rule for the first control on the server.

Step S604: If at least one filtered first control includes a second control, output a prompt for setting a filtering rule for the second control; and after it is detected that the filtering rule for the second control is set, filter, according to the specified filtering rule for the second control, the second control included in each filtered first control, to obtain a second configuration file and a filtered second control. After viewing the prompt, the developers of the mobile device vendor or the third-party developers set the filtering rule for the second control based on the second control and the provided setting manner of the filtering rule for the second control. Correspondingly, if the settings of the filtering rule for the first control are stored on the mobile device, when the filtering rule for the second control is set, the developers of the mobile device vendor store settings of the filtering rule for the second control on the mobile device. If the settings of the filtering rule for the first control are stored on the server, when the filtering rule for the second control is set, the developers of the mobile device vendor or the third-party developers store settings of the filtering rule for the second control on the server.

Step S605: Perform adaptability processing on the filtered first control and the filtered second control, to obtain a processed result; and display a newly obtained AOD theme based on the processed result and the second configuration file.

The device includes but is not limited to a mobile device and a server. The mobile device includes but is not limited to a smartwatch, a smart band, and a smartphone. The server includes but is not limited to a cloud server.

Optionally, the settings of the filtering rule for the first control in step S603 and the settings of the filtering rule for the second control in step S604 may alternatively be adjusted to: output a prompt for setting the filtering rule for the first control and the filtering rule for the second control; and after it is detected that the filtering rule for the first control and the filtering rule for the second control are set, filter the first control and the second control according to the specified filtering rule for the first control and the specified filtering rule for the second control, to obtain a filtered first control, a filtered second control, and a second configuration file.

In addition, there are the following optional cases regardless of whether the developed screen-on theme is pre-stored on the mobile device before delivery or pre-stored on the server. Optionally, if the third-party developers may further set an update setting manner for the first control and an update setting manner for the second control in this method, the second configuration file includes the foregoing update setting manners set by the third-party developers. If the third-party developers do not set an update setting manner for the first control and an update setting manner for the second control in this method, the second configuration file still retains the original update setting manners for the first control and the second control of the screen-on theme. Preferably, the update setting manner for the first control and the update setting manner for the second control in this method are not open to the third-party developers for an editing function. In other words, the developers of the mobile device vendor preset the update setting manner for the first control and the update setting manner for the second control in this method. The third-party developers cannot edit and modify the update setting manner for the first control and the update setting manner for the second control in this method. In this method, update of the first control and the second control neither affects generation of the first control, the second control, and the second configuration file, and nor affects running of this method. For example, in this method, the third-party developers preset that Weather is updated every 30 minutes. After timing duration reaches 30 minutes, a weather control is automatically updated without being affected and without affecting the running of this method.

In other words, when the screen-on theme developed based on the predetermined defining and setting manner is pre-stored on the mobile device, and the filtering rule for the first control and the filtering rule for the second control are set based on the predetermined setting manner of the filtering rule for the first control and the predetermined setting manner of the filtering rule for the second control, the AOD theme can be displayed based on the screen-on theme and according to the specified control filtering rules, and stored on the mobile device. In this way, the developers of the mobile device vendor do not need to develop an AOD theme corresponding to the screen-on theme.

In addition, after the third-party developers upload, to the server, the screen-on theme developed based on the predetermined defining and setting manner, and set the filtering rule for the first control and the filtering rule for the second control based on the predetermined setting manner of the filtering rule for the first control and the predetermined setting manner of the filtering rule for the second control, the AOD theme can be displayed based on the screen-on theme and according to the specified control filtering rules, and stored on the server. In this way, the third-party developers do not need to develop an AOD theme corresponding to the screen-on theme. The server may be a cloud server.

In this way, the screen-on theme obtained by the mobile device belongs to the preset screen-on theme. In this case, the developers of the mobile device vendor or the third-party developers only need to set the filtering rule for the first control and the filtering rule for the second control based on the predetermined setting manner of the filtering rule for the first control, the predetermined setting manner of the filtering rule for the second control, and the first configuration file included in the screen-on theme, and the developers of the mobile device vendor or the third-party developers do not need to develop an AOD theme. Therefore, according to this method, workload of the developers of the mobile device vendor or the third-party developers is greatly reduced, and development costs are reduced. In addition, the mobile device does not need to store an AOD theme, and the AOD theme can be generated and displayed by using this method. Therefore, according to this method, less storage space of the mobile device is occupied. The mobile device includes but is not limited to a smartwatch, a smart band, and a smartphone. Any type of mobile device that can be figured out by a person skilled in the art falls within the scope of the mobile device.

In addition, the first control in this application includes but is not limited to a date control, a weather control, a sports and health control, a time control, a geographic control, a battery level control, and a notification control. Basic units related in the defining manner for the first control and the defining manner for the second control include but are not limited to a static image, a text box, a progress bar, and a pattern selection box. This application further provides manners of defining the controls by using the basic units. The static image includes but is not limited to a background and an icon. The static images are named by using different IDs. A smartwatch, a smart band, and a smartphone are used as examples. The background includes but is not limited to a watch face image. The sports and health control is used as an example. An icon of the sports and health control may be a shoe, for indicating step count. One or more pieces of subscribed data may be embedded in the text box. For example, one or more texts or numbers may be embedded in the text box. One or more patterns and/or texts and/or numbers and/or pieces of subscribed data may be embedded in the pattern selection box. The pattern includes but is not limited to a static image and a progress bar. The subscribed data is data obtained through direct subscription from a data service provided by an operating system of the mobile device. The subscribed data includes but is not limited to date data, weather data, sports and health data, time data, geographic data, battery level data, and notification data. The date data includes but is not limited to a year, a month, a week, a date, a tens digit of date, a units digit of date, a date ratio, a week ratio, a month ratio, and a year ratio. The weather data includes but is not limited to weather, a temperature value, a PM2.5 index, and an AQI (Air Quality Index, air quality index). The sports and health data includes but is not limited to a step count, a calorie value, a heart rate value, a maximum oxygen uptake, a medium and high intensity time, a standing time, a maximum heart rate value, a minimum heart rate value, a units digit of step count, a tens digit of step count, a hundreds digit of step count, a thousands digit of step count, a ten thousands digit of step count, a heart rate ratio, a calorie ratio, a medium and high intensity time ratio, a step ratio, a standing time ratio, and a maximum oxygen uptake ratio. The time data includes but is not limited to an hour in 24-hour clock, an hour in 12-hour clock, an hour, a minute, a second, morning/afternoon in 12-hour clock, a tens digit of hour in 12-hour clock, a units digit of hour in 12-hour clock, a tens digit of hour in 24-hour clock, a units digit of hour in 24-hour clock, a tens digit of hour, a units digit of hour, a tens digit of minute, a units digit of minute, a tens digit of second, a units digit of second, an hour ratio, a minute ratio, a second ratio, a ratio of hours in 12-hour clock, and a ratio of hours in 24-hour clock. The geographic data includes but is not limited to an altitude, a pressure value, a longitude and a latitude, and a location. The battery level data includes but is not limited to remaining power and a percentage value of the remaining power. The notification data includes but is not limited to a quantity of unread messages. The date control, the weather control, the sports and health control, the time control, the geographic control, the battery level control, and the notification control respectively include all or some of the date data, the weather data, the sports and health data, the time data, the geographic data, the battery level data, and the notification data. The weather control is used as an example, and the weather control further includes but is not limited to second controls such as a weather control, a temperature control, and a humidity control. Further, subdivision may be further performed on the second controls. The subdivision manner and defining manner of the second controls are the same as or similar to the manner of subdividing the first control into second controls and the defining manner of the first control. Details are not described herein again.

Shapes of the text box and the pattern selection box include but are not limited to common shapes such as a circle, a star, a heart, a rectangle, a triangle, and a polygon. The common shapes include a two-dimensional shape and/or a three-dimensional shape. The foregoing shapes such as a circle are merely examples of common shapes. Any shape that can be figured out by a person skilled in the art falls within the scope of the foregoing common shapes. The progress bar may include a linear progress bar, a circular progress bar, and/or a progress bar in another shape. The progress bar may be a dynamic progress bar. Parameters related in the defining manners include but are not limited to a name of the first control, a name of the second control, a type of the first control, a type of the second control, coordinates of an upper left corner of the text box, a width of the text box, a height of the text box, a red component value of a text color, a green component value of the text color, a blue component value of the text color, an ID of a referenced static image, coordinates of an upper left corner of the pattern selection box, a width of the pattern selection box, a height of the pattern selection box, coordinates of the circle center of the circular progress bar, a radius of the circular progress bar, a width of the circular progress bar, a start angle of the circular progress bar, an end angle of the circular progress bar, coordinates of an upper left corner of a linear progress bar, a length of the linear progress bar, a width of the linear progress bar, coordinates of a rotation center, a rotation start angle, a rotation end angle, one or more pieces of subscribed data, line spacing, an alignment mode, a font symbol, a transparency value of the text, and a connector between two pieces of data. Defining may be performed by assigning a specific value to all or a part of the foregoing parameters, or may be performed in another manner.

During development of the screen-on theme pre-stored on the mobile device or stored on the server, the first control and the second control are also defined and updated according to the provided predetermined defining and setting manner by using all or some of the basic units. In this method, the developers of the mobile device vendor or the third-party developers are prompted to set the filtering rule for the first control and the filtering rule for the second control based on the predetermined defining and setting manner. The developers of the mobile device vendor or the third-party developers may set all or a part of the first controls and the second controls provided in this method and all or a part of the parameters depending on an actual requirement, the foregoing setting manners provided in this method, the foregoing defining manners provided in this method, the filtering rule for the first control, and the filtering rule for the second control.

The first control included in the screen-on theme and the defining manner for the first control that are provided in this application may be schematically shown by using an example in which the date control is defined. In an example in which the date control is defined, some pseudocode are as follows:

```
. . .
label="date"
type="static"
drawable_x="125"
drawable_y="387"
drawable_width="104"
drawable_height="37"
color_red="255"
color_green="255"
color_blue="255"
line_spacing="0"
alpha="153"
font_type="F_EUROSTILELT_DEMI_32"
alignment_type="MIDDLE"
data_connect_type="CONN_SOLID"
data_type="data_weekday"
data2_type="data_date"
. . .
```

Figure 12A:
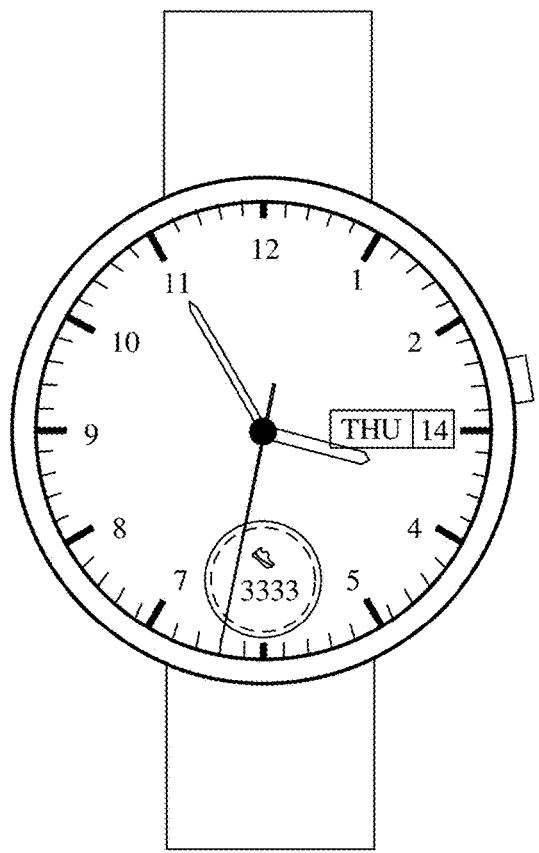
FIG. 12a to FIG. 12d are a schematic diagram in which a smartwatch switches from a screen-on theme to an AOD theme according to Embodiment 2 of this application.

In addition, in the setting of the filtering rule for the first control and the filtering rule for the second control, a specific filtering manner may be set to extracting or selecting several features and deleting several of the foregoing features, or may be another manner. The foregoing several features include but are not limited to a blob feature, a corner feature, and a line feature. Local feature points of an image include a blob and a corner. The blob usually refers to an area that has a color and grayscale difference from a surrounding area. The corner is a corner of an edge of an object in an image or an intersection part between lines. The line feature refers to a line or a line segment in an image. The blob feature in the image may be extracted or selected based on a Laplace of Gaussian blob detection algorithm or another detection algorithm. The corner feature in the image may be extracted or selected based on a Harris corner detection algorithm or another detection algorithm. The line feature in the image may be extracted or selected based on a Canny edge detection algorithm or another detection algorithm. In an example in which the blob feature is extracted or selected, an area that uses an image center as a center of a circle whose radius is fewer than 20 pixels may be extracted or selected. FIG. 12*a* is used as an example. The foregoing area may correspond to a circle area that is enclosed by a solid circle and that includes an icon of step count, 3333, and a dashed circle in FIG. 12*a*. In an example in which the corner feature is extracted or selected, an intersection point of two vertical line segments may be extracted or selected. FIG. 12*a* is used as an example. The intersection point may correspond to a noise that may appear in FIG. 12*a*. In an example in which the line feature is extracted or selected, a line that has fewer than 10 pixels in length in the image may be extracted or selected. FIG. 12*a* is used as an example. The foregoing line may correspond to a small scale on scales of the watch face in FIG. 12*a*. The foregoing blob feature, corner feature, and line feature, and extraction or selection manners of the blob feature, the corner feature, and the line feature are merely examples for description. Other features and other extraction or selection manners also fall within the scope of embodiments of this application. In addition, an extraction or selection sequence of the foregoing several features is not limited, and any order combination manner falls within the scope of embodiments of this application.

Figure 7:
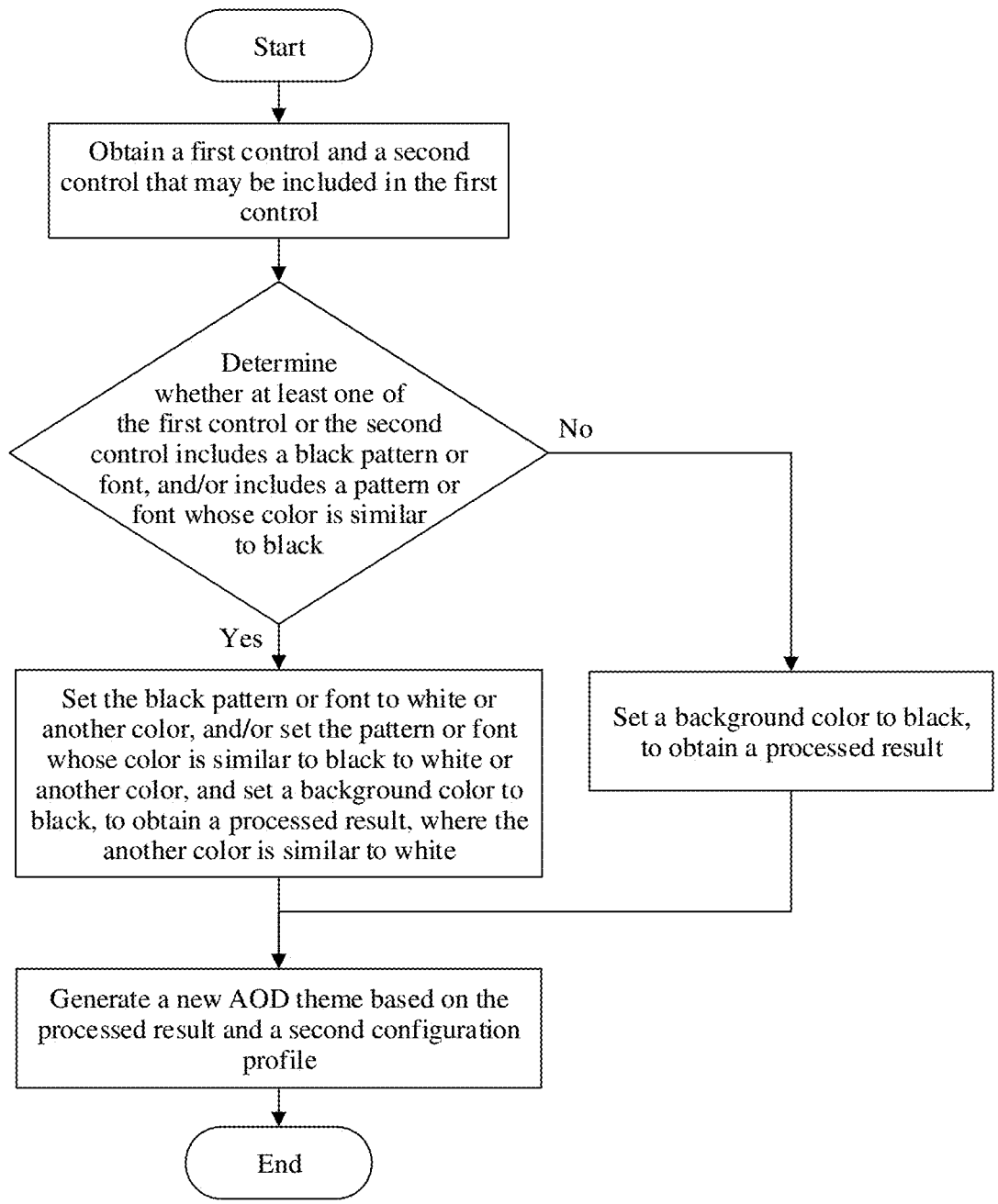
FIG. 7 is a schematic flowchart of an adaptability processing step in FIG. 6.

Adaptability processing on the filtered first control and the filtered second control is performed, to obtain a processed result. A new user interface is generated based on the processed result. A new AOD theme is obtained for the new user interface based on the second configuration file. Specific steps are shown in FIG. 7. After the first control and the second control that may be included in the first control are obtained, whether at least one of the first control or the second control includes a black pattern or font, and/or includes a pattern or font whose color is similar to black is determined. If the at least one of the first control or the second control includes a black pattern or font, and/or includes a pattern or font whose color is similar to black, the black pattern or font, and/or the pattern or font whose color is similar to black are/is set to white or another color, and a background color is set to black, to obtain a processed result. The another color is similar to white. Then, a new AOD theme is generated based on the processed result and the second configuration file. If the at least one of the first control or the second control neither includes a black pattern or font nor a pattern or font whose color is similar to black, a background color is set to black, to obtain a processed result. Then, a new AOD theme is obtained based on the processed result and the second configuration file. The new AOD theme corresponds to the screen-on theme.

Figure 12B:
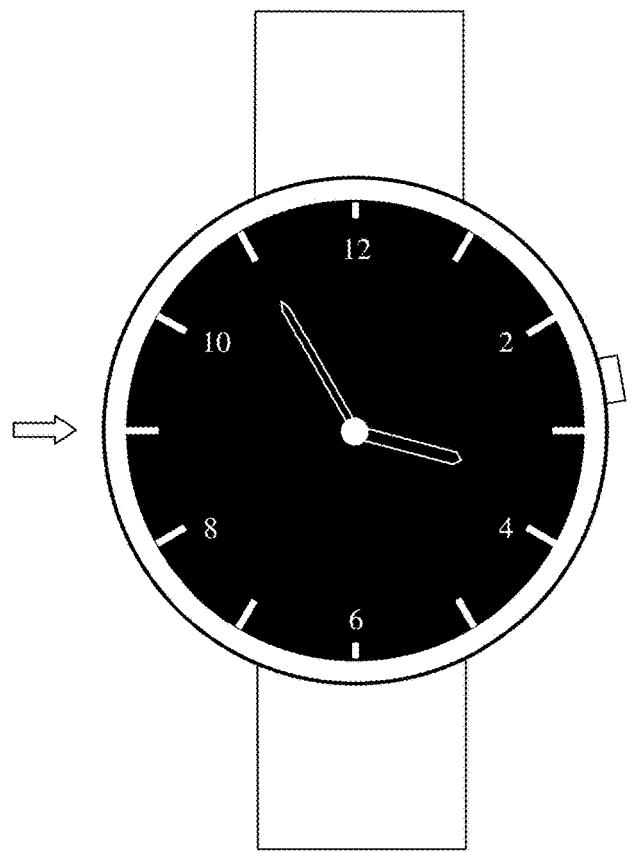

FIG. 12*a* and FIG. 12*b* are used as an example for further description. FIG. 12*a* shows a pre-stored screen-on theme of a smartwatch. FIG. 12*b* shows an AOD theme of the smartwatch. The first control is filtered from FIG. 12*a*. Specifically, after it is determined that the screen-on theme shown in FIG. 12*a* is the preset screen-on theme, a first configuration file of the screen-on theme is obtained; and the first configuration file is parsed to obtain a first control that is included in the screen-on theme and a second control that may be related in each first control. A filtering rule for the first control is prompted to be set based on the first control and a provided setting manner of a filtering rule for the first control. The specified filtering rule for the first control may be, for example, deleting a sports and health control and deleting a date control. After the filtering rule for the first control is set, the first control included in the screen-on theme is filtered based on the specified filtering rule for the first control, to obtain a filtered first control and a filtered first configuration file. A filtering rule for the second control is prompted to be set based on the second control related in each first control and a provided setting manner of a filtering rule for the second control. The specified filtering rule for the second control may be, for example, deleting a second hand for a time control, and deleting small scales between adjacent big scales in the time control on a watch face and odd numbers corresponding to the big scales. After the filtering rule for the second control is set, the second control included in each first control is filtered based on the specified filtering rule for the second control, to obtain a filtered second control related in each first control and a second configuration file. Then, adaptability processing is performed on the first control and the second control; and a black pattern or font is set to white, and a background color is set to black, to obtain a processed result. A new AOD theme shown in FIG. 12*b* is generated based on the processed result and the second configuration file, and displayed. In FIG. 12*b*, the new AOD theme enables the smartwatch neither to display the first controls: the sports and health control and the date control, nor to display the second controls in the filtered first control, namely, the time control: the second hand, the small scales between the adjacent big scales on the watch face, and the odd numbers corresponding to the big scales.

Figure 13:
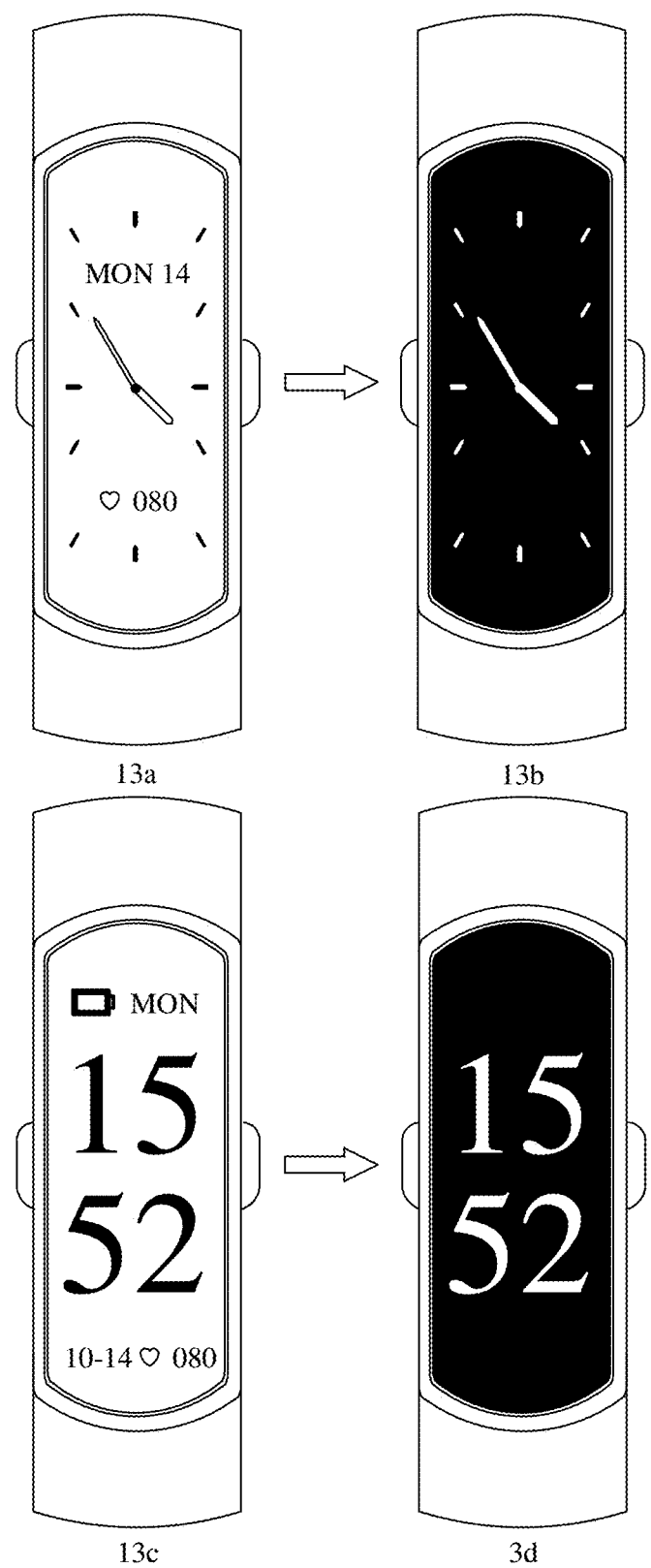
FIG. 13 is a schematic diagram in which a smart band switches from a screen-on theme to an AOD theme according to Embodiment 2 of this application.
Figure 14A:
FIG. 14a to FIG. 14d are a schematic diagram in which a smartphone switches from a screen-on theme to an AOD theme according to Embodiment 2 of this application.
Figure 14B:
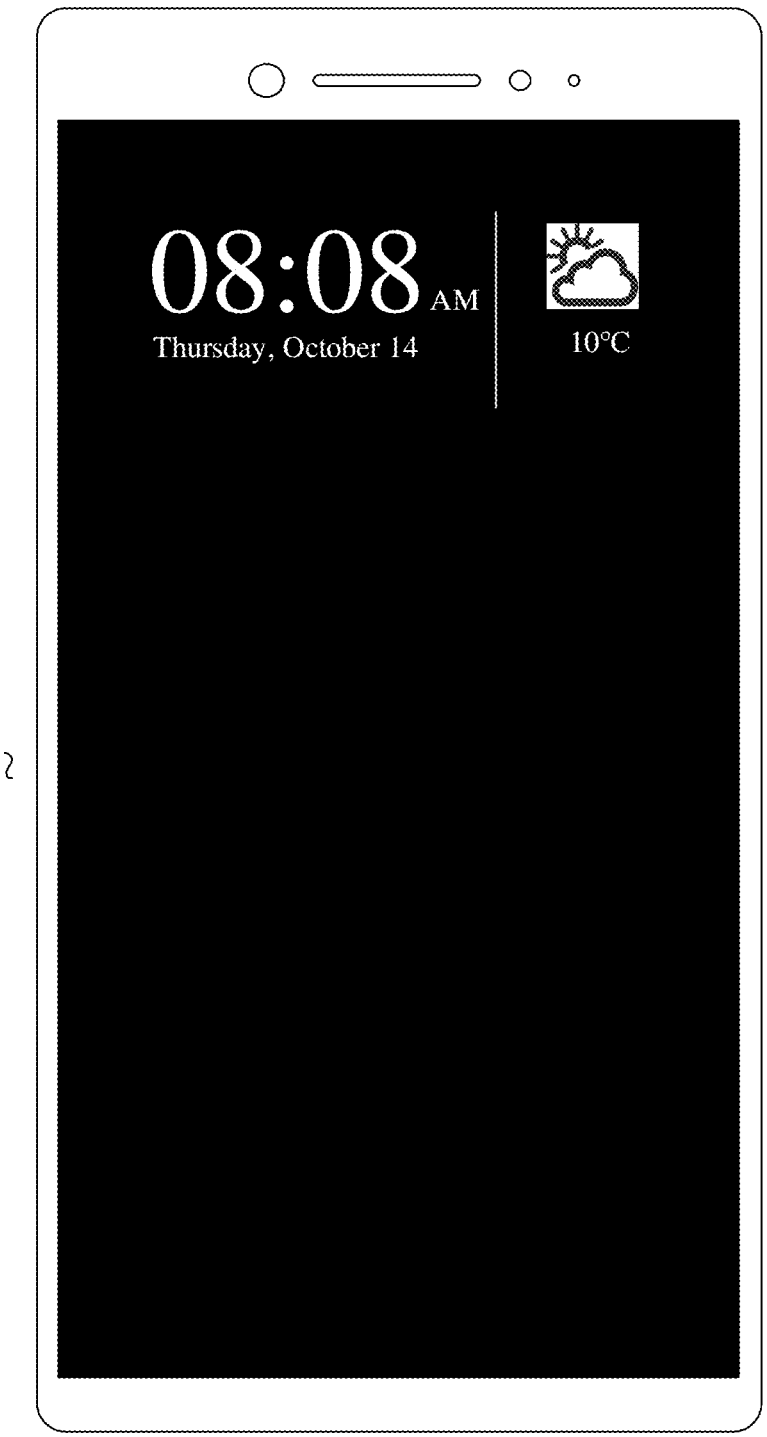
Figure 14C:
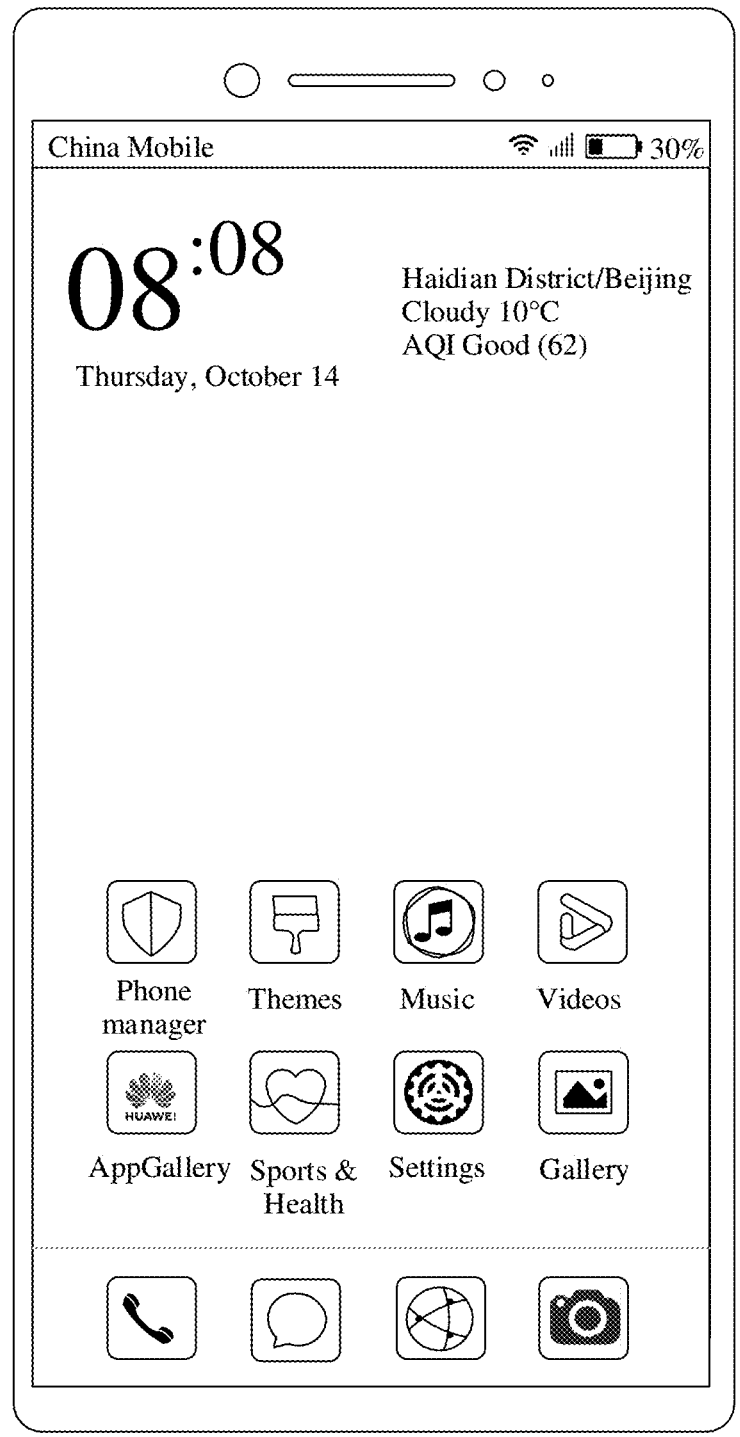
Figure 14D:
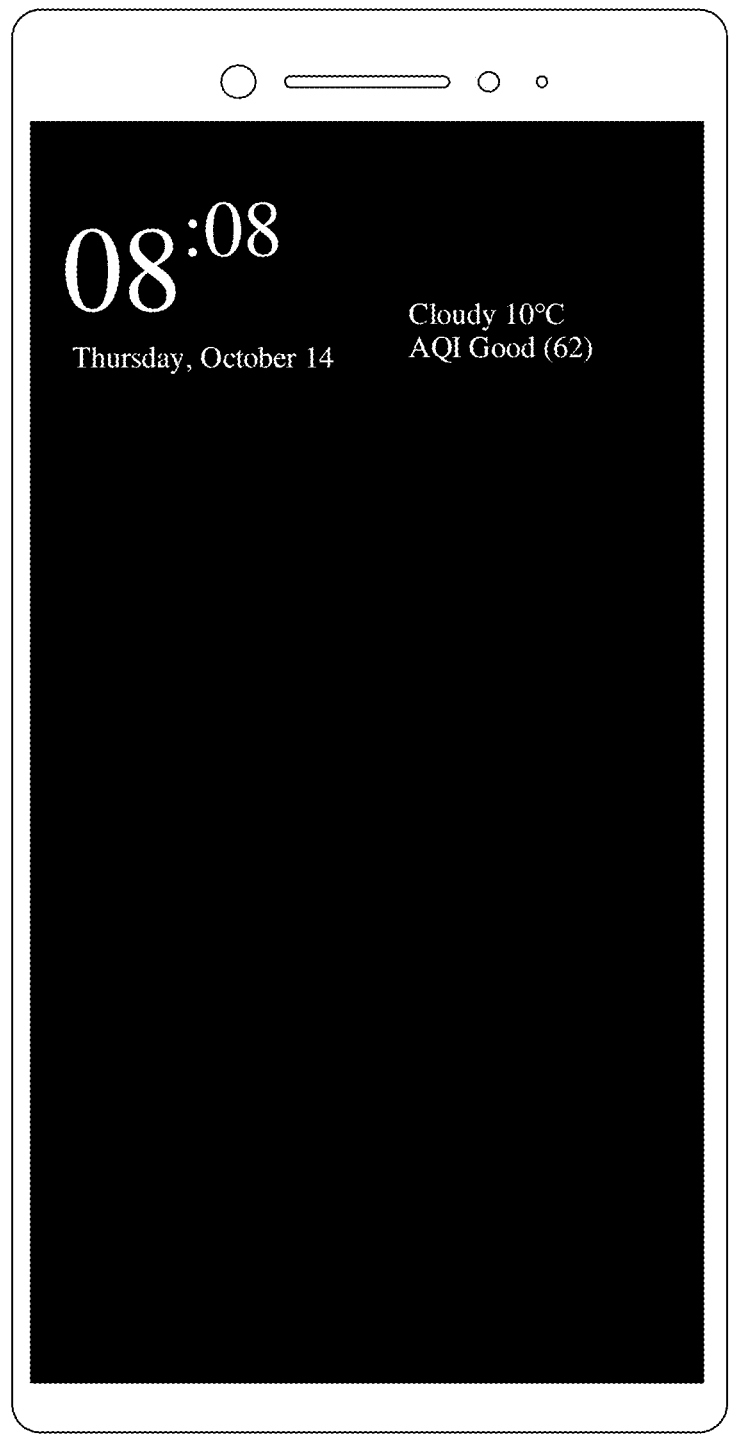

Examples in 13*a* and 13*b* in FIG. 13 and FIG. 14*a* and FIG. 14*b* are similar to the examples in FIG. 12*a* and FIG. 12*b*. Details are not described herein again. In this way, in this method, the developers of the mobile device vendor or the third-party developers only need to set the filtering rule for the first control and the filtering rule for the second control based on the screen-on theme stored on the mobile device or the server and the predetermined setting manners of the filtering rule for the first control and the filtering rule for the second control, and do not need to develop an AOD theme. Other steps in this method are automatically performed. Therefore, according to this method, workload of the developers of the mobile device vendor or the third-party developers is greatly reduced, and development costs are reduced. In addition, because the AOD theme may be generated and displayed by using this method, the mobile device may no longer need to store the AOD theme. Therefore, according to this method, less storage space of the mobile device is occupied.

Embodiment 2

Embodiment 2 of this application provides an AOD theme display method. A control filtering manner is provided for a user, so that the user selects, based on the control filtering manner and a screen-on theme, a specific control for filtering, to automatically generate and display an AOD theme. Alternatively, a filtering manner for controls at more than two layers is provided for the user, to meet a user requirement for more refined or personalized settings. This improves user experience. In addition, after a mobile device receives and applies a new screen-on theme, when the mobile device enters an AOD state from a screen-on state, a corresponding AOD theme can be displayed based on the new screen-on theme and the specific control for filtering that is selected by the user. In addition, a control included in the corresponding AOD theme is a part or all of controls included in the new screen-on theme, or a part or all of controls that are included in the new screen-on theme and that are slightly changed, so that the AOD theme viewed by the user on the mobile device is consistent with or close to the screen-on theme in style. This provides good user experience.

Figure 8:
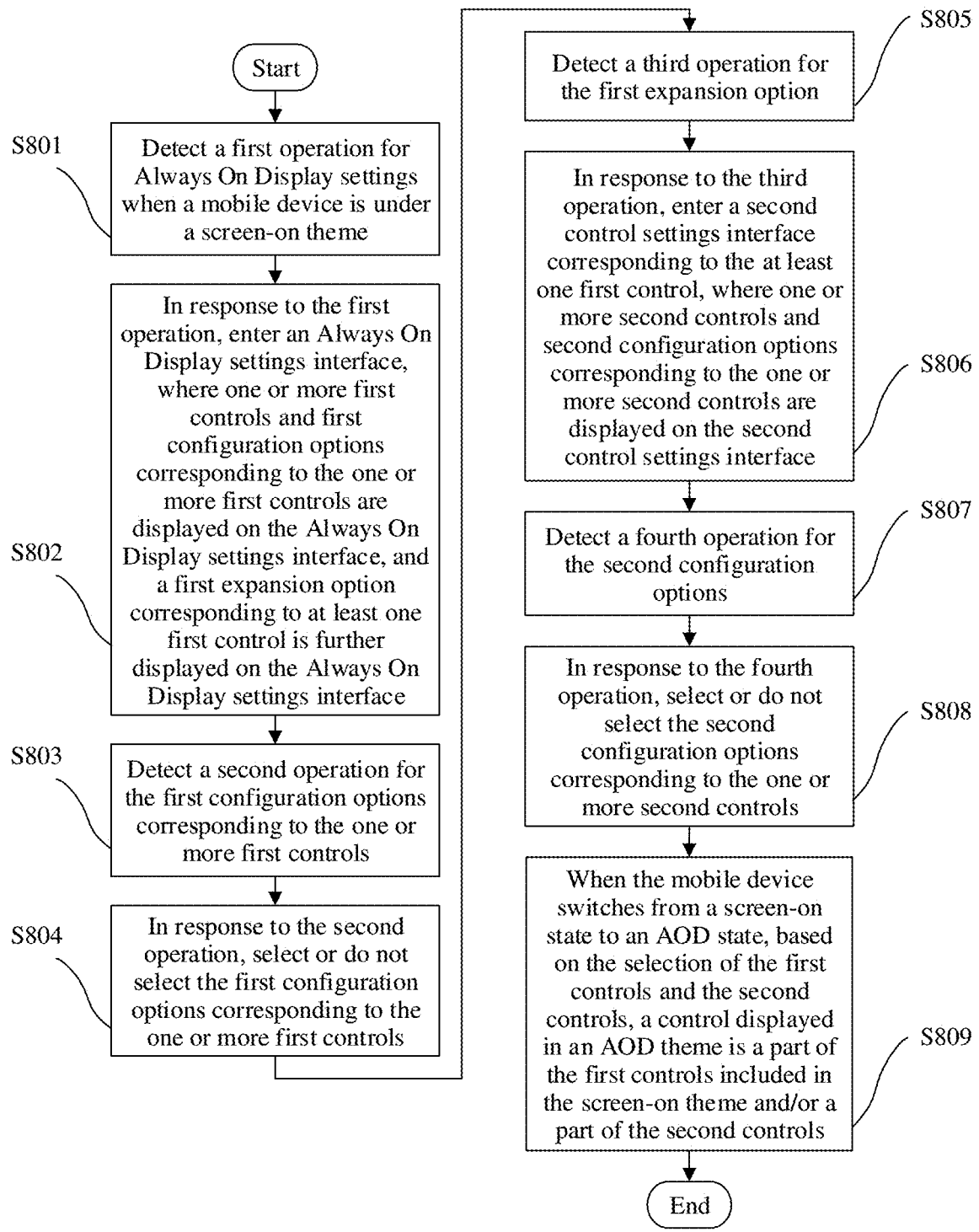
FIG. 8 is a schematic flowchart of an AOD theme display method according to Embodiment 2 of this application.

The AOD theme display method provided in Embodiment 2 of this application is for a user of a mobile device. FIG. 8 is a schematic flowchart of this method according to Embodiment 2 of this application. The method shown in FIG. 8 is described by using controls at two layers as an example. As shown in FIG. 8, the method includes the following steps.

S801: Detect a first operation for Always On Display settings when a mobile device is under a screen-on theme. The first operation includes a plurality of implementations. For example, "Settings", "Desktop and wallpaper", and "Always On Display" are sequentially touched and tapped to enter an Always On Display settings interface. Certainly, the foregoing is merely an example, and does not limit the protection scope of the method. The first operation may be another operation. Names of "Settings", "Desktop and wallpaper", and "Always On Display" in the foregoing description are also merely examples, and may be other names.

S802: In response to the first operation, enter the Always On Display settings interface, where one or more first controls and first configuration options corresponding to the one or more first controls are displayed on the Always On Display settings interface, and a first expansion option corresponding to at least one first control is further displayed on the Always On Display settings interface.

S803: Detect a second operation for the first configuration options corresponding to the one or more first controls.

S804: In response to the second operation, select or do not select the one or more first controls. Optionally, none of the one or more first controls is selected. Optionally, all of the one or more first controls are selected. Optionally, some of the one or more first controls are selected, and some are not selected.

S805: Detect a third operation for the first expansion option.

S806: In response to the third operation, enter a second control settings interface corresponding to the at least one first control, where one or more second controls and second configuration options corresponding to the one or more second controls are displayed on the second control settings interface.

S807: Detect a fourth operation for the second configuration options.

S808: In response to the fourth operation, select or do not select the one or more second controls.

S809: When the mobile device switches from a screen-on state to an AOD state, based on the selection of the first controls and the second controls, a control displayed in an AOD theme is a part of the first controls included in the screen-on theme and/or a part of the second controls.

Actually, the method is not limited to the controls at two layers, and the controls included in the method may alternatively be controls at more than two layers such as controls at three layers. When the controls are the controls at three layers, corresponding steps are similar to the steps shown in FIG. 8, and only a detection operation and a response operation for a control at the third layer are added. Correspondingly, when the controls are controls at three more layers, steps are correspondingly added. Details are not described herein again. Optionally, the first operation, the second operation, the third operation, and the fourth operation may be one or more taps such as a tap or a double tap, voice input, and the like. Certainly, the operations may be performed in other manners. This is not limited herein.

In the method shown in FIG. 8, the AOD theme is determined through the selection of the first controls included in the screen-on theme and/or the second controls. After the mobile device applies the screen-on theme, the mobile device obtains a first configuration file included in the screen-on theme. After a user completes the selection of the first controls and/or the second controls, the first configuration file is automatically updated to a second configuration file. Specifically, the second configuration file is automatically updated based on the first configuration file obtained through parsing of the screen-on theme and the selection on the first configuration option and/or the second configuration option. The AOD theme is formed by combining, according to configuration of the second configuration file, all of the first controls and the second controls that are selected to be displayed.

In this way, after the method shown in FIG. 8 is performed, when the mobile device switches from the screen-on state to the AOD state, the control included in the AOD theme is a part of the first controls included in the screen-on theme and/or a part of the second controls. In this case, the AOD theme is consistent with or close to the screen-on theme in style. The first control is a control included in the screen-on theme, and the second control is a lower-level control of the first control. In addition, the screen-on theme may be a screen-on theme pre-stored on the mobile device, or may not be a screen-on theme pre-stored on the mobile device.

In this way, a more refined setting manner is provided for the user. A user requirement for more refined or personalized settings may be met through the settings of the controls at two layers. This improves user experience. For further description with reference to a specific example and for ease of description, the following still uses only a setting architecture of the controls at two layers: the first control and the second control for description.

In addition, after using the screen-on theme pre-stored on the mobile device for a long time, the user may get bored, and wants to obtain and apply a new screen-on theme. The user may obtain a new screen-on theme by downloading the theme from a theme application on the mobile device, or may operate the mobile device to obtain a new screen-on theme in a receiving manner from another mobile device or a PC, or may obtain a new screen-on theme in another manner. Examples are not provided herein one by one. The following uses the smartwatch shown in FIG. 9*a* and FIG. 9*b* as an example for further description.

Figures 9A, 9B:
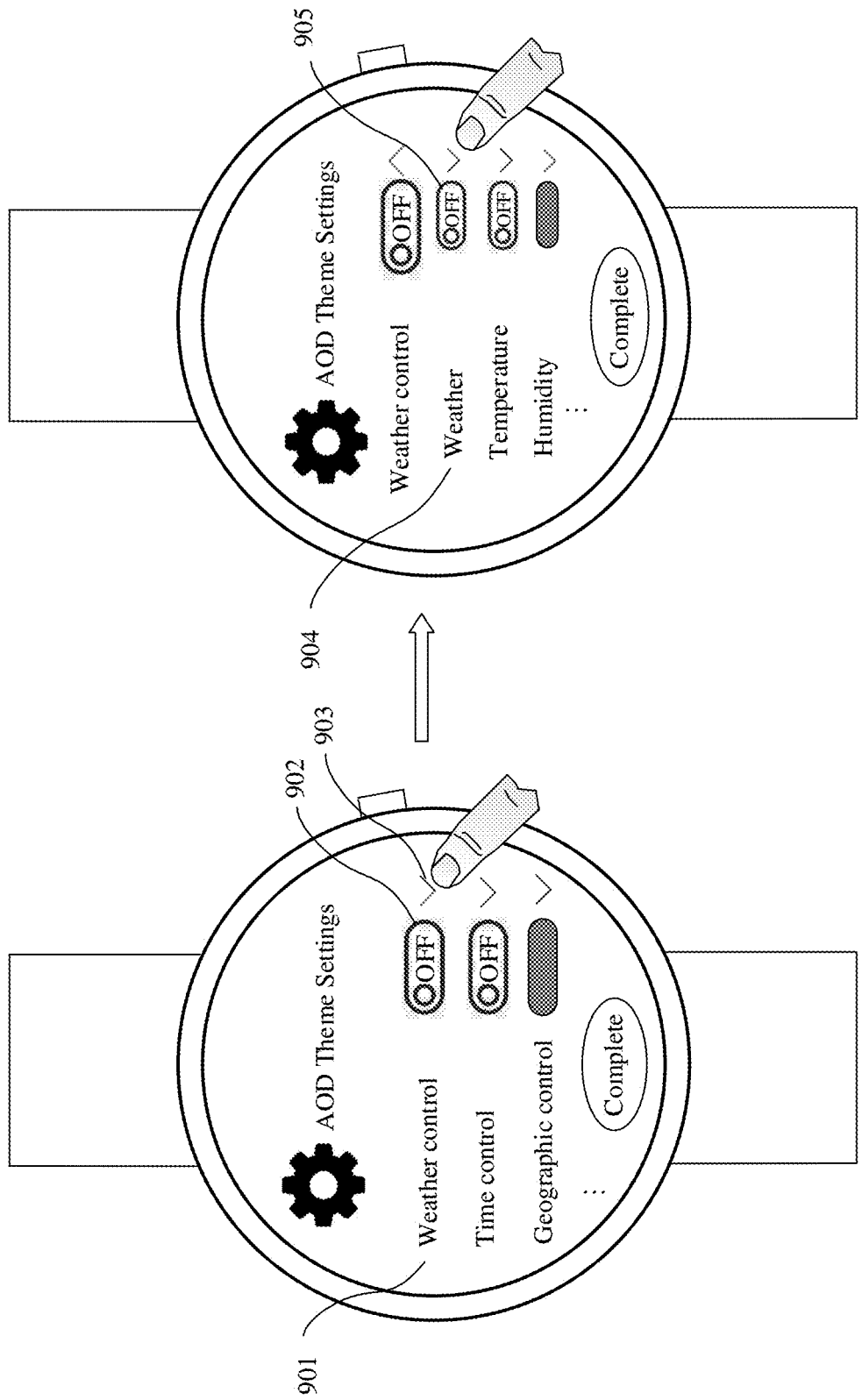
FIG. 9a to FIG. 9d are a schematic diagram of filtering settings for an AOD theme of a smartwatch in an AOD theme display method according to Embodiment 2 of this application.

When the smartwatch obtains and applies a new screen-on theme, the smartwatch detects a first operation for Always On Display settings, and enters an Always On Display settings interface in response to the first operation. As shown in FIG. 9*a*, a weather control, a time control, and a geographic control are displayed on the Always On Display settings interface, where the weather control, the time control, and the geographic control are all first controls, and first configuration options that separately correspond to the weather control, the time control, and the geographic control. A first expansion option corresponding to at least one first control is further displayed on the Always On Display settings interface, and the first expansion option is located on a right side of the first control. The weather control is used as an example. A weather control 901 is the first control, a configuration option on a right side of the weather control is a first configuration option 902, and a dropdown symbol on a right side of the configuration option is a first expansion option 903. After a user touches the first expansion option 903, the interface shown in FIG. 9*a* is switched to the interface shown in FIG. 9*b*. On the interface shown in FIG. 9*b*, the weather control is expanded. After the weather control is expanded, "Weather" below the weather control is a second control 904, a configuration option on a right side of "Weather" is a second configuration option 905, and a dropdown symbol on a right side of the second configuration option 905 is a second expansion option for a sub-layer. Although the first configuration options are in a one-to-one correspondence with the first controls in FIG. 9*a*, the correspondence between the first configuration options and the first controls shown in FIG. 9*a* is merely an example for description, and does not limit the foregoing correspondence. Alternatively, the first configuration options may be in a one-to-many correspondence or a many-to-one correspondence with the first controls. Preferably, the first configuration options are in a one-to-one correspondence with the first controls. Similarly, the first expansion option is also preferably in a one-to-one correspondence with the first control. In addition, the interface shown in FIG. 9*a* does not include only the weather control, the time control, and the geographic control, and the first configuration options and the first expansion options that correspond to the weather control, the time control, and the geographic control. The user may perform an operation such as sliding up and down, sliding left and right, or sliding in another direction, to display another first control and a first configuration option and a first expansion option that correspond to the another first control. The user may control, through selection on a first configuration option corresponding to any first control, a control to be displayed on an AOD theme. For example, if "OFF" of the first configuration option 902 is selected, the weather control 901 is not displayed on the AOD theme after the setting is completed and the AOD theme is entered. If "ON" of the first configuration option 902 is selected, the weather control 901 is displayed on the AOD theme after the setting is completed and the AOD theme is entered. The AOD theme corresponds to the current screen-on theme. It should be noted that "ON" on the interface shown in FIG. 9*a* is covered by a circle button because "ON" is selected. Therefore, "ON" is not displayed in FIG. 9*a*. In some embodiments, a first expansion option is set next to a first configuration option corresponding to any first control. In some embodiments, a first expansion option is set next to a first configuration option corresponding to a first control only when the first control is preset to include a control at a sub-layer. The user may tap the first expansion option to expand the corresponding first control, to perform more refined display control on the first control. In FIG. 9*a*, the user taps the first expansion option 903 corresponding to the weather control 901. Then, the interface shown in FIG. 9*a* is switched to the interface shown in FIG. 9*b*. On the interface shown in FIG. 9*b*, when the weather control is expanded, second controls such as "Weather", "Temperature", and "Humidity" and second configuration options corresponding to the second controls are displayed. The second controls may be in a one-to-one correspondence, a one-to-many correspondence, or a many-to-one correspondence with the second configuration options. Preferably, the second controls are in a one-to-one correspondence with the second configuration options. On the interface shown in FIG. 9*b*, "Weather" is used as an example. "Weather" is the second control 904, and the configuration option on the right side of "Weather" is the second configuration option 905. Similarly, the user controls, through selection on a second configuration option corresponding to any second control, whether to display the second control on the AOD theme. For example, in FIG. 9*b*, if "OFF" of the second configuration option 905 is selected, the second control "Weather" is not displayed on the AOD theme after the setting is completed and the AOD theme is entered. If "ON" of the second configuration option 905 is selected, the second control "Weather" is displayed on the AOD theme after the setting is completed and the AOD theme is entered. The AOD theme corresponds to the current screen-on theme. It should be noted that "ON" on the interface shown in FIG. 9*b* is covered by a circle button because "ON" is selected. Therefore, "ON" is not displayed in FIG. 9*b*. Regardless of the first configuration option corresponding to the first control and the second configuration option corresponding to the second control, the foregoing "ON" and "OFF" and location relationships of the foregoing "ON" and "OFF" are merely examples, and do not limit the scope of embodiments of this application. For example, "ON" and "OFF" may not be displayed. Tapping or sliding a button to the left indicates enabling, and tapping or sliding the button to the right indicates disabling. Alternatively, locations of "ON" and "OFF" may be exchanged. Other alternative manners of "ON" and "OFF" and any combination of the locations of "ON" and "OFF" all fall within the scope of embodiments of this application. Further, a second expansion option for a sub-layer may be further set next to the second configuration option. Similar to the foregoing description, more refined control may be performed by expanding the second expansion option for the sub-layer. Details are not described herein again.

Figure 9D:
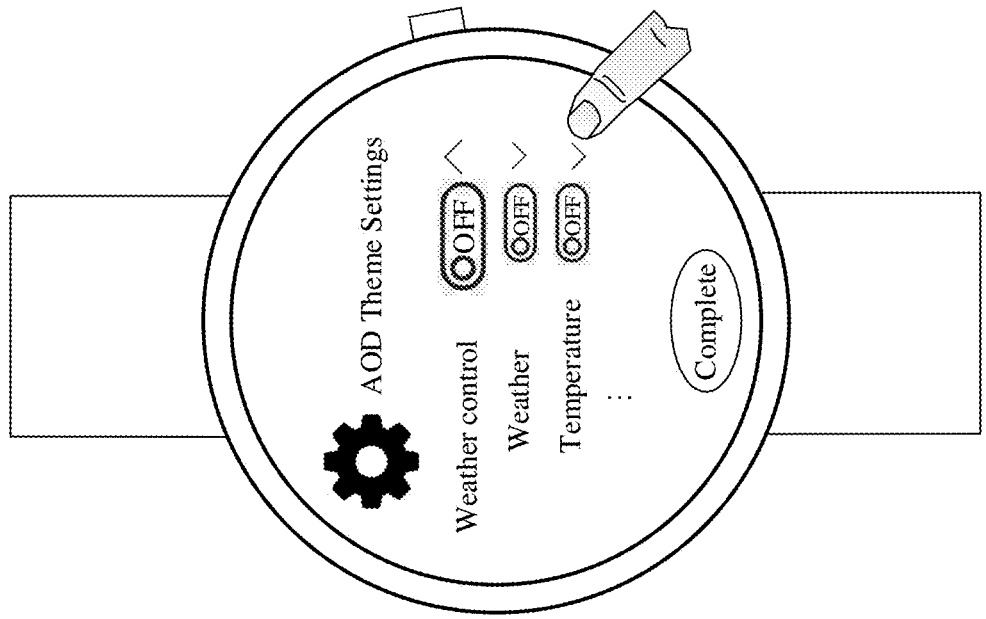
Figure 9C:
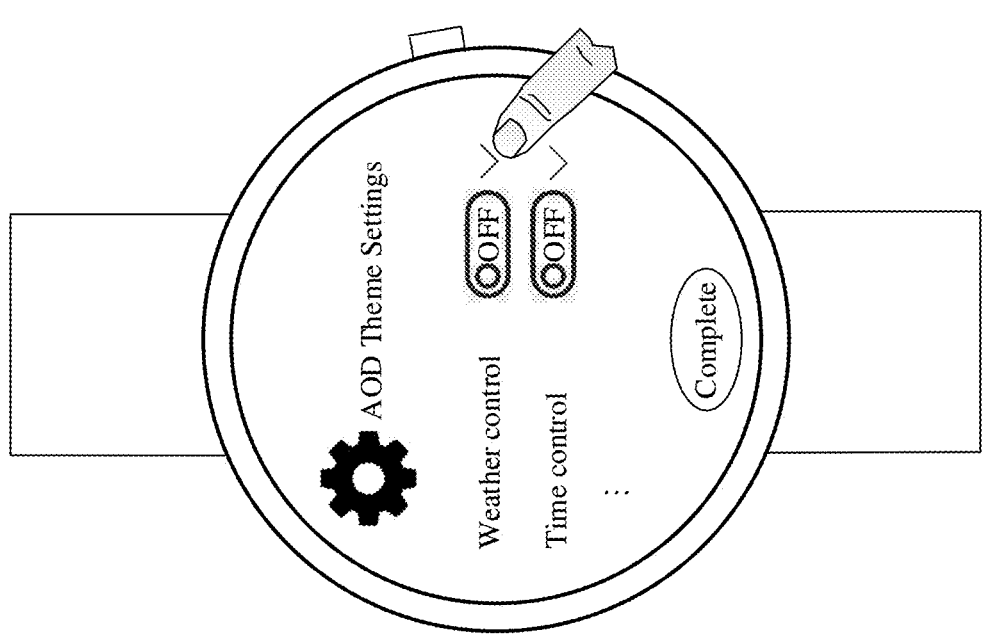

In addition, on the AOD theme settings interface of the smartwatch shown in FIG. 9*a* or FIG. 9*b*, a first configuration option corresponding to any first control and/or a second configuration option corresponding to any second control are/is gray. This indicates that the current screen-on theme does not include the first control and/or the second control. For example, the first configuration option corresponding to the geographic control in FIG. 9*a* is gray, and the second configuration option corresponding to the control "Humidity" in FIG. 9*b* is gray. This indicates that the current screen-on theme does not include the first control, namely, the geographic control, and the second control "Humidity". In addition, as shown in FIG. 9*c* and FIG. 9*d*, all of the first controls and the second controls included in the current screen-on theme may be displayed. The smartwatch automatically identifies, by parsing a configuration file of the current screen-on theme, a first control that is not included in the current screen-on theme and/or a second control that is not included in each first control, and sets, to gray, a first configuration option corresponding to the first control and/or a second configuration option corresponding to the second control, where the first control and the second control are not included in the current screen-on theme. After the settings on the interface shown in FIG. 9*b* is completed, "Complete" is tapped to return to the interface shown in FIG. 9*a*. After the settings on the interface shown in FIG. 9*a* is completed, settings of the AOD theme is completed by tapping "Complete". After the tapping on the interface shown in FIG. 9*a* is completed, the smartwatch automatically completes a corresponding update on the first configuration file of the current screen-on theme based on the foregoing settings performed by the user, to obtain a second configuration file. It should be noted that on the interfaces shown in FIG. 9*a* and FIG. 9*b*, the "Complete" buttons or options are not necessary. In some embodiments, the "Complete" buttons or options may not be set on the interfaces in FIG. 9*a* and FIG. 9*b*. Returning from the interface shown in FIG. 9*b* to the interface shown in FIG. 9*a* indicates that the settings on the interface shown in FIG. 9*b* is completed; and returning from the interface shown in FIG. 9*a* indicates that the settings on the interface shown in FIG. 9*a* is completed.

In addition, after the user sets, according to a preference or habit of the user, the first control and/or the second control included in the AOD theme, the smartwatch performs adaptability processing based on the second configuration file when switching from the screen-on state to the AOD state. The adaptability processing includes: Whether the first control and/or the second control include/includes a black pattern or font, and/or includes a pattern or font whose color is similar to black is determined. If the first control and/or the second control includes a black pattern or font, and/or includes a pattern or font whose color is similar to black, the black pattern or font is set to white or another color, and/or the pattern or font whose color is similar to black is set to white or another color, and a background color is set to black, to obtain a processed first control and a processed second control. The another color is similar to white. Then, the new AOD theme is displayed based on the processed first control, and/or the processed second control, and the second configuration file.

Figure 12C:
Figure 12D:
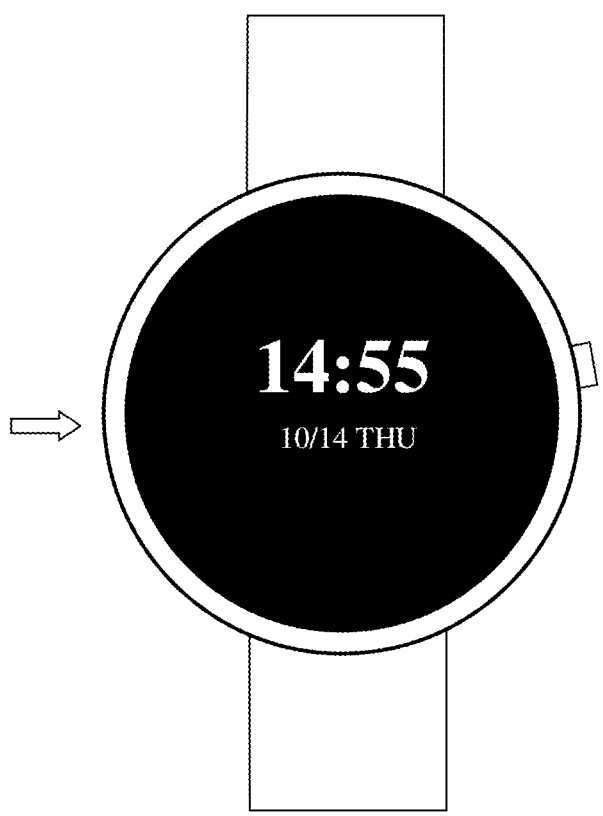

After the settings are completed according to FIG. 9a and FIG. 9b or according to FIG. 9c and FIG. 9d, changes of the screen-on theme and the AOD theme are further described with reference to FIG. 12a to FIG. 12d. FIG. 12a shows a pre-stored screen-on theme of the smartwatch. FIG. 12b shows an AOD theme displayed after the smartwatch switches from the screen-on state in FIG. 12a to the AOD state. FIG. 12c shows a newly downloaded screen-on theme that the smartwatch applies. FIG. 12d shows an AOD theme displayed after the smartwatch switches from the screen-on state in FIG. 12c to the AOD state. The newly downloaded screen-on theme shown in FIG. 12c is different from the pre-stored screen-on theme shown in FIG. 12a.

The AOD theme shown in FIG. 12b is displayed based on the pre-stored screen-on theme shown in FIG. 12a and according to a predefined filtering rule or according to a filtering rule set by the user. Therefore, controls included in the AOD theme shown in FIG. 12b are some of first controls and/or second controls included in the screen-on theme shown in FIG. 12a. The AOD theme shown in FIG. 12b is consistent with the screen-on theme shown in FIG. 12a in style. The AOD theme shown in FIG. 12d is displayed based on the newly downloaded screen-on theme shown in FIG. 12c and according to a filtering rule set by the user. Therefore, controls included in the AOD theme shown in FIG. 12d are some of first controls and/or second controls included in the AOD theme shown in FIG. 12c. In this way, the AOD theme shown in FIG. 12d is consistent with the newly downloaded screen-on theme shown in FIG. 12c in style.

In this way, even if a current screen-on theme is a screen-on theme downloaded from a theme application on a mobile device, and applied on the mobile device, when the mobile device switches from a screen-on state to an AOD state, and when the mobile device switches back to the screen-on state from the AOD state, the AOD theme is consistent with or close to the current screen-on theme in style. This provides good user experience. For example, after a user uses a Huawei mobile phone to download a new screen-on theme by using Themes that is pre-installed on the Huawei mobile phone, and apply the new screen-on theme, the user may set a control included in an AOD theme under the current screen-on theme. After the setting is completed, when the user operates the mobile device to switch to the AOD theme, the control included in the AOD theme is a part or all of first controls and/or second controls included in the screen-on theme. When the mobile device switches from the screen-on state to the AOD state, and switches back to the screen-on state from the AOD state, the AOD theme viewed by the user is consistent with or close to the screen-on theme in style. This improves user experience.

The AOD theme display method provided in Embodiment 2 of this application is also applicable to a screen-on theme pre-stored on the mobile device. For example, when the current screen-on theme of the mobile device is a screen-on theme pre-stored on the mobile device, the mobile device automatically identifies a first control included in the current screen-on theme and a second control included in each first control. After an Always On Display settings interface of the mobile device is entered, the first control included in the screen-on theme, a corresponding first configuration option, and a first expansion option are automatically displayed on the Always On Display settings interface. The user performs selection on the first configuration option corresponding to the first control. Further/alternatively, after a second control settings interface of the mobile device is entered, the second control included in each first control and a corresponding second configuration option are automatically displayed on the second control settings interface. The user performs selection on the second configuration option corresponding to the second control. When the mobile device is switched from the screen-on state to the AOD state based on the selection on the first configuration option and/or the second configuration option, the control included in the AOD theme is a part or all of the first controls and/or the second controls included in the screen-on theme. The Always On Display settings interface or the second control settings interface of the mobile device may be entered in the following manners: one or more taps, and/or one or more voice inputs, or another manner. This is not limited herein. In this way, the user can implement more refined selection settings based on the current screen-on theme and a preference of the user.

Figures 10A, 10B:
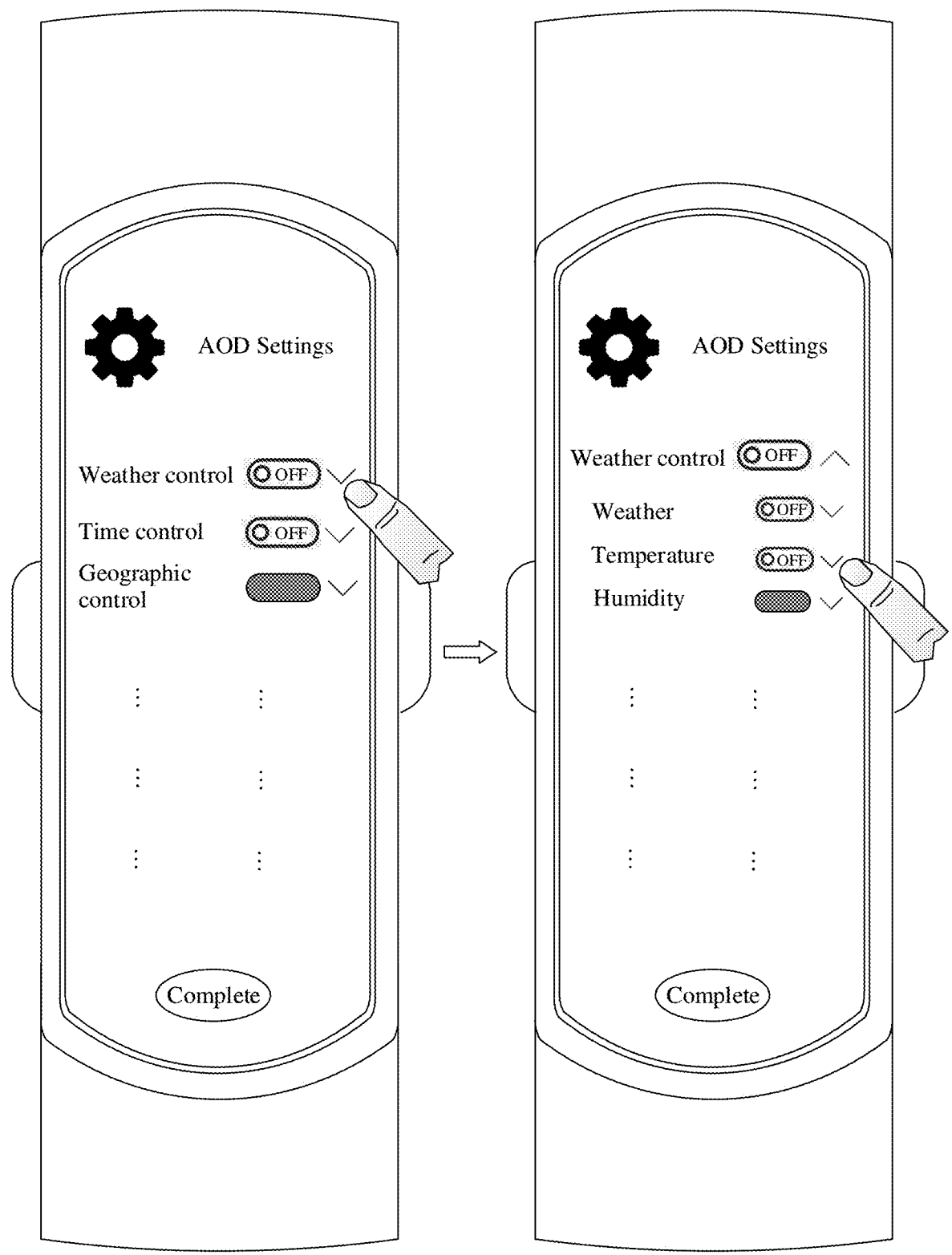
Figure 11A:
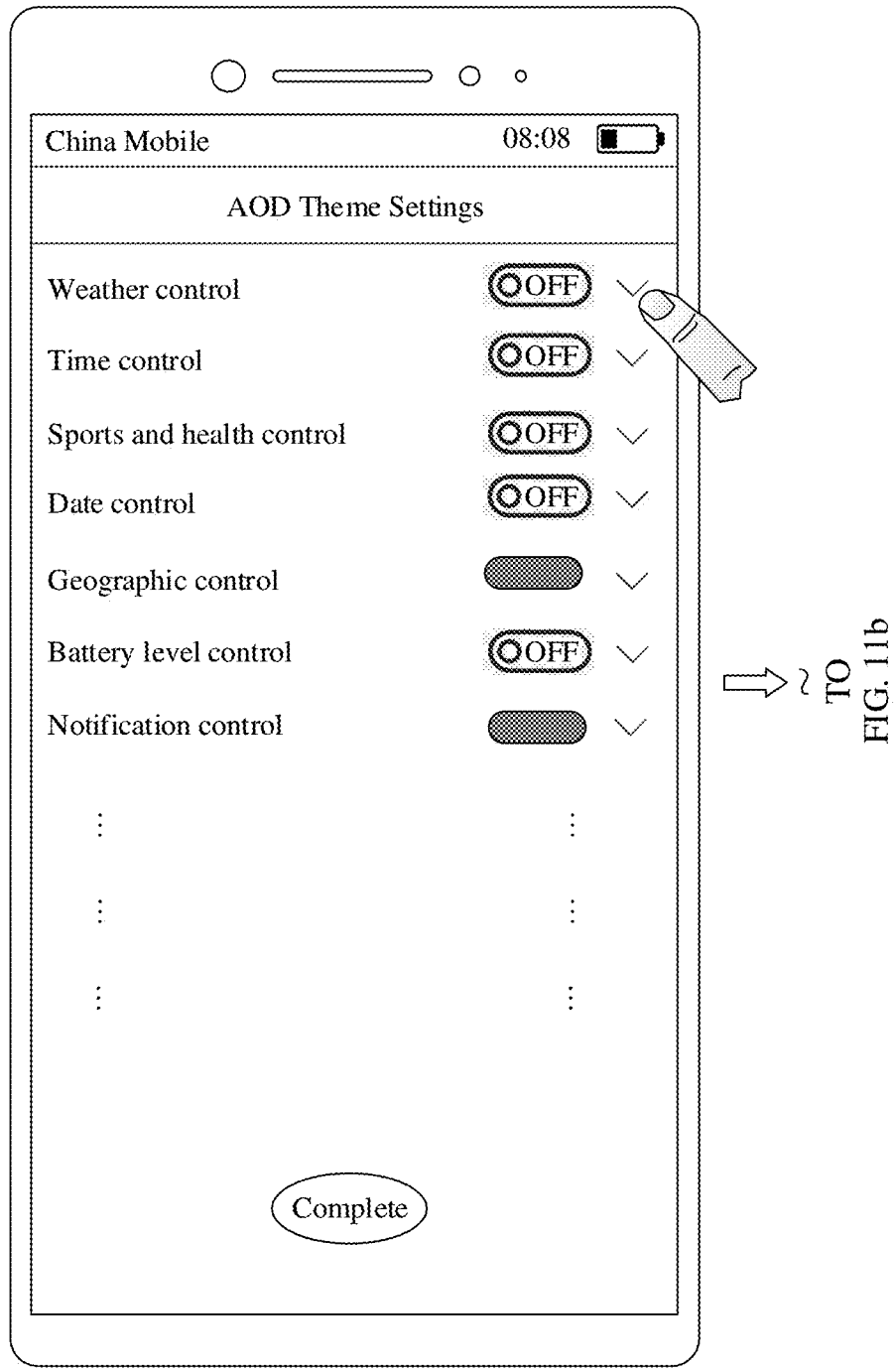
FIG. 11a to FIG. 11d are a schematic diagram of filtering settings for an AOD theme of a smartphone in an AOD theme display method according to Embodiment 2 of this application.
Figure 11B:
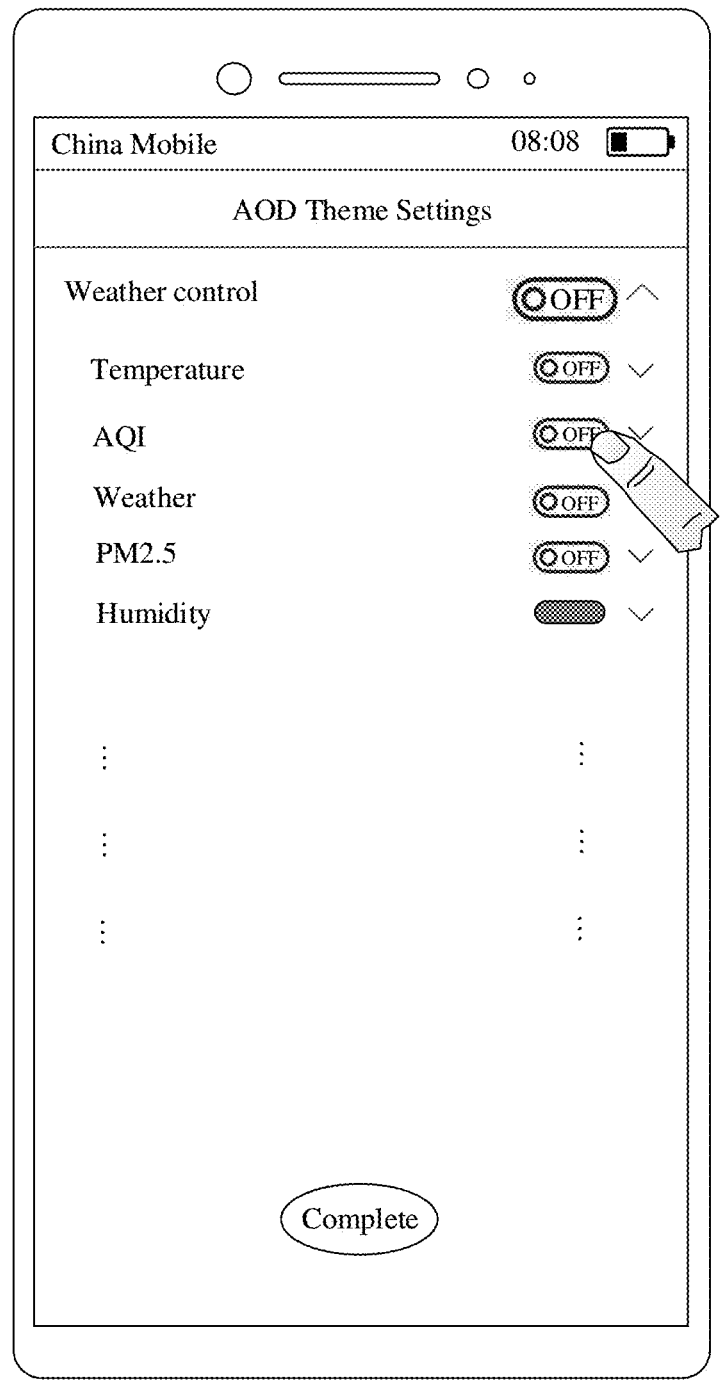
Figure 11C:
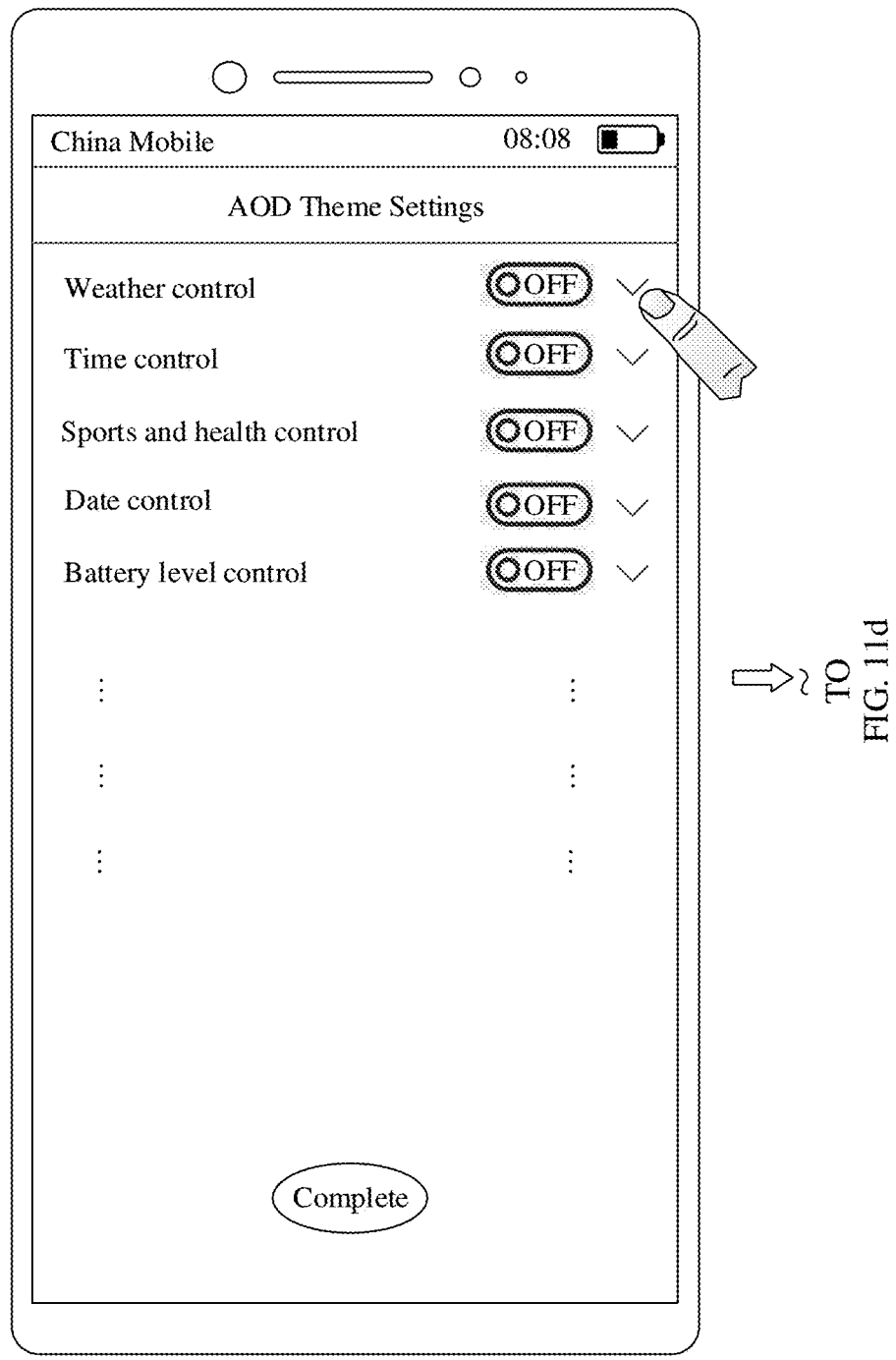
Figure 11D:
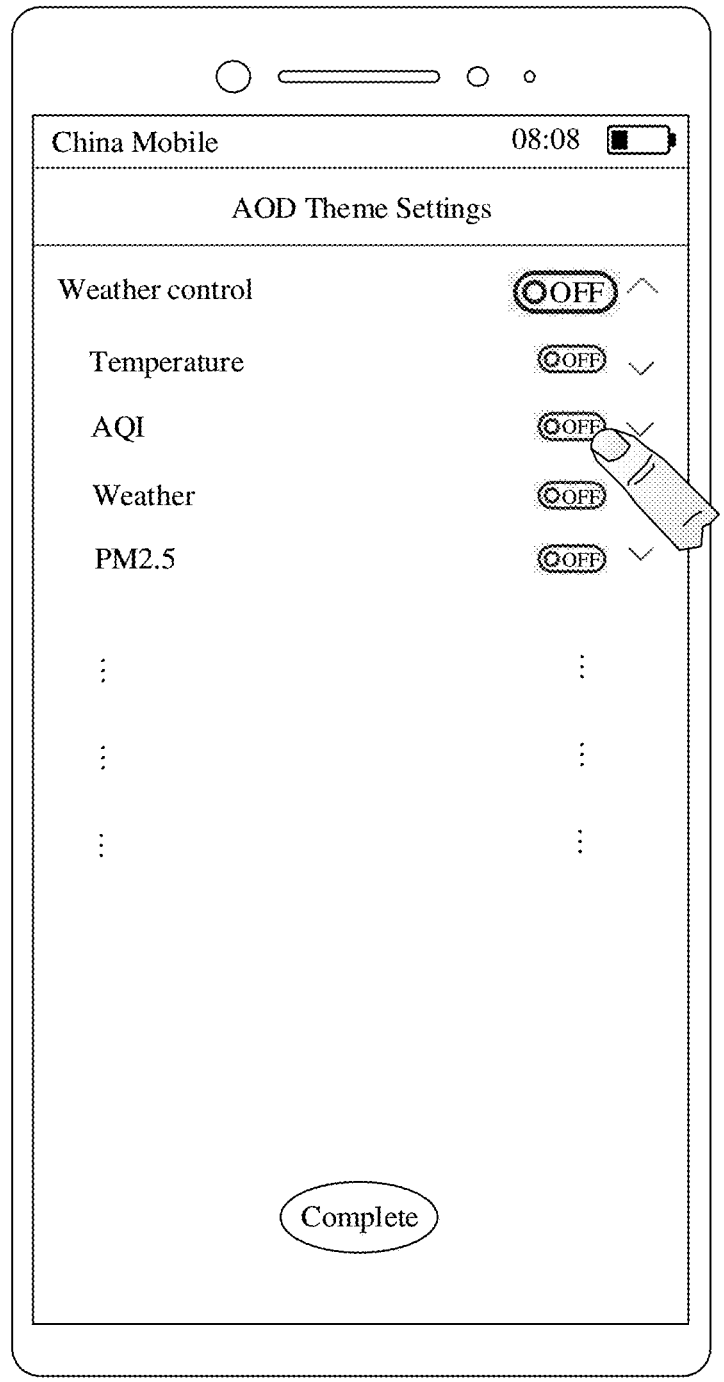

Although in Embodiment 2 of this application, only the smartwatch shown in FIG. 9a to FIG. 9d and FIG. 12a to FIG. 12d are used as an example to describe an AOD theme setting process of the mobile device and a relationship between the screen-on theme and the AOD theme. However, a person skilled in the art should understand that the foregoing process and relationship are also applicable to the smart band shown in FIG. boa to FIG. 10d and FIG. 13 and the smartphone shown in FIG. 12a to FIG. 11d and FIG. 14a to FIG. 14d. Therefore, for the smart band shown in FIG. 11a to FIG. 10d and FIG. 13 and the smartphone shown in FIG. 11a to FIG. 11d and FIG. 14a to FIG. 14d, AOD theme setting processes, and relationships between screen-on themes and AOD themes are not described again.

In other words, after the user downloads a new screen-on theme from the theme application on the mobile device or receives a new screen-on theme from another device and applies the new screen-on theme, and after the mobile device switches from the screen-on state to the AOD state, the mobile device displays an AOD theme based on user setting of the first control included in the screen-on theme and/or the second control that may be included in each first control. A control included in the AOD theme is a part or all of the first controls and/or the second controls included in the new screen-on theme. Therefore, the AOD theme is consistent with or close to the new screen-on theme in style.

In addition, an embodiment of this application further provides a mobile device. After the mobile device obtains and applies a new screen-on theme, when the mobile device switches from a screen-on state to an AOD state, based on selection setting on a first configuration option corresponding to a first control and/or a second configuration option corresponding to a second control, a control included in an AOD theme of the mobile device is a part or all of the first controls and/or the second controls included in the screen-on theme.

The screen-on theme obtained and applied by the mobile device may be a screen-on theme pre-stored on the mobile device, or may be a new screen-on theme downloaded and obtained from the theme application, or may be a new screen-on theme received from another mobile device or a server. The mobile device includes but is not limited to a smartwatch, a smart band, and a smartphone.

Optionally, this method may further provide an option for users, developers of a mobile device vendor, and third-party developers to modify a color, a shape, a pattern, and the like for a control of an AOD theme, so that the user, the developers of the mobile device vendor, and the third-party developers can perform slight modification after the AOD theme is obtained. Still, the AOD theme is enabled to be consistent with or close to the newly downloaded screen-on theme in style. In this way, after the user uses the mobile device, when the mobile device switches from the screen-on theme to the AOD theme, or when the mobile device switches from the AOD theme to the screen-on theme, a consistent or close style can be provided for the user. The mobile device may use an AOD theme generation method provided in embodiments of this application.

Optionally, when the mobile device downloads the new screen-on theme from the theme application, the mobile device may further actively identify an AOD theme corresponding to the new screen-on theme on the theme application, and downloads the AOD theme together. After the mobile device applies the new screen-on theme, and the mobile device switches from the new screen-on theme to an AOD theme, the mobile device directly displays the downloaded AOD theme. Alternatively, on the server, a correspondence is established between a screen-on theme and an AOD theme that is generated according to a filtering rule set by the developers of the mobile device vendor or the third-party developers, and when a user downloads one of the screen-on theme and the AOD theme, the other corresponding theme is recommended to the user. For example, the user downloads a screen-on theme, and the server may recommend, to the user, an AOD theme corresponding to the screen-on theme. The server may be a cloud server.

Figure 15:
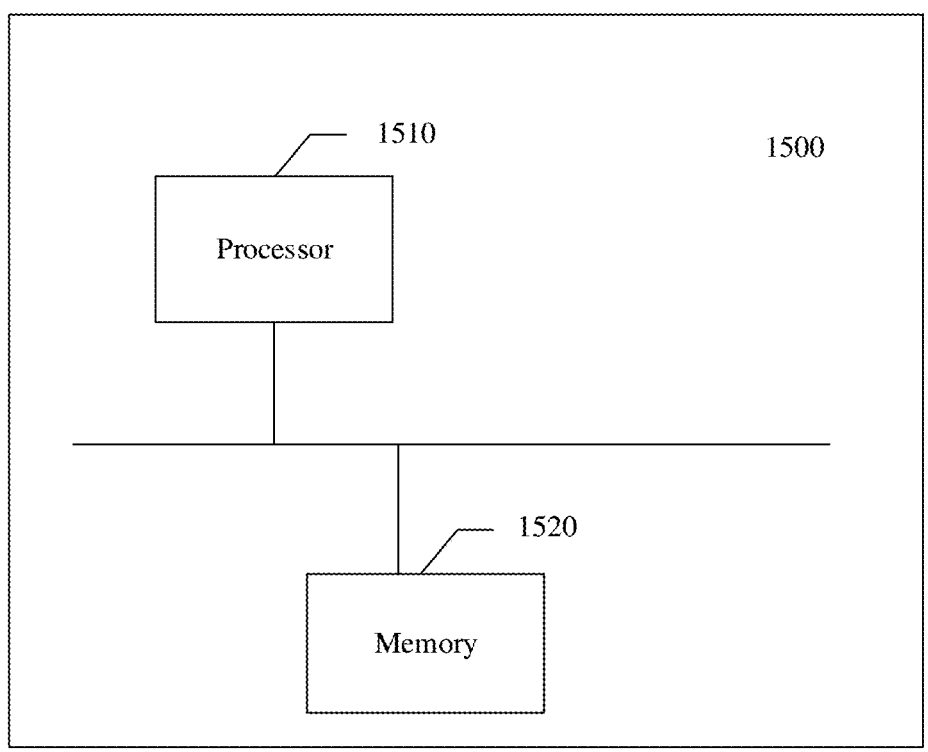
FIG. 15 is a schematic diagram of a structure of a mobile device according to Embodiment 2 of this application.

FIG. 15 shows a mobile device 1500 according to this application. For example, the mobile device 1500 includes at least one processor 1510 and a memory 1520. The processor 1510 is coupled to the memory 1520. Coupling in embodiments of this application may be a communication connection, an electrical connection, or another form of connection. Specifically, the memory 1520 is configured to store program instructions. The processor 1510 is configured to invoke the program instructions stored in the memory 1520, so that the mobile device 1500 performs the steps performed by the mobile device 1500 in the Always On Display theme display method provided in embodiments of this application, or the mobile device 1500 performs the steps performed by the mobile device 1500 in the Always On Display theme generation method provided in embodiments of this application. It should be understood that the mobile device 1500 may be configured to implement the Always On Display theme display method provided in embodiments of this application, or the mobile device 1500 may be configured to implement the Always On Display theme generation method provided in embodiments of this application. For related features, refer to the foregoing description. Details are not described herein again.

This application provides a server. For example, the server includes at least one processor and a memory. The processor is coupled to the memory. Coupling in embodiments of this application may be a communication connection, an electrical connection, or another form of connection. Specifically, the memory is configured to store program instructions. The processor is configured to invoke the program instructions stored in the memory, so that the server performs the steps performed by the server in the Always On Display theme generation method provided in embodiments of this application. It should be understood that the server may be configured to implement the Always On Display theme display method provided in embodiments of this application. For related features, refer to the foregoing description. Details are not described herein again. The server may be a cloud server.

This application provides a computer program product including instructions. When the computer program product runs on a mobile device, the mobile device is enabled to perform the steps performed by the mobile device in the Always On Display theme display method provided in embodiments of this application, or the mobile device is enabled to perform the steps performed by the mobile device in the Always On Display theme generation method provided in embodiments of this application.

This application provides a computer program product including instructions. When the computer program product runs on a server, the server is enabled to perform the steps performed by the server in the Always On Display theme generation method provided in embodiments of this application.

This application provides a computer-readable storage medium, including instructions. When the instructions are run on a mobile device, the mobile device is enabled to perform the steps performed by the mobile device in the Always On Display theme display method provided in embodiments of this application, or the mobile device is enabled to perform the steps performed by the mobile device in the Always On Display theme generation method provided in embodiments of this application.

This application provides a computer-readable storage medium, including instructions. When the instructions are run on a server, the server is enabled to perform the steps performed by the server in the Always On Display theme generation method provided in embodiments of this application.

A person skilled in the art may clearly understand that embodiments of this application may be implemented by hardware, or by hardware and software. When hardware and software are used for implementation, the foregoing functions may be stored in a computer-readable medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in embodiments of this application. The storage medium includes any medium that can store program code, such as a USB flash drive, a removable hard disk, a read-only memory, a random access memory, a magnetic disk, or an optical disc.

The foregoing description is merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. An Always On Display (AOD) theme display method, the method comprises:
   detecting a first operation for AOD settings when a mobile device is under a screen-on theme;
      entering, in response to detecting the first operation, an AOD settings interface, wherein M first controls, and first configuration options that are in a one-to-one correspondence with the M first controls, are displayed on the AOD settings interface, wherein the M first controls are text based descriptions of discrete elements of the screen-on theme, wherein M is a positive integer greater than or equal to 1, wherein first expansion options that are in a one-to-one correspondence with N first controls are further displayed on the Always On Display settings interface, and wherein N is a positive integer greater than or equal to 1 and less than or equal to M;
   detecting a second operation for the first configuration option;
   selecting, in response to detecting the second operation, at least one first control;
   detecting a third operation for the first expansion option;
   entering, in response to the third operation, a second control settings interface corresponding to one first control, wherein P second controls, and second configuration options that are in a one-to-one correspondence with the P second controls, are displayed on the second control settings interface, and wherein P is a positive integer greater than or equal to 1;
   detecting a fourth operation for the second configuration option;
   selecting, in response to detecting the fourth operation, at least one second control; and
   displaying, based on the mobile device being switched from a screen-on state to an AOD state, a control in an AOD theme as a part of at least one of the first controls and the second controls displayed in the screen-on theme.

2. The method according to claim 1, wherein the screen-on theme is a screen-on theme downloaded from a theme application on the mobile device, or a screen-on theme received from another mobile device, a computer, or a server.

3. The method according to claim 1, wherein the screen-on theme of the mobile device is pre-stored by a mobile device vendor on the mobile device before delivery.

4. The method according to claim 1, wherein the method further comprises:
   displaying, on the second control settings interface, second expansion options that are in a one-to-one correspondence with the P second controls;
   detecting a fifth operation for the second expansion option;
   entering, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;
   detecting a sixth operation for the third configuration option;
   selecting, in response to detecting the sixth operation, at least one third control; and
   displaying, based on the mobile device being switched from the screen-on state to the AOD state, a control in the AOD theme as a part of at least one of the first controls, the second controls, and the third controls displayed in the screen-on theme.

5. The method according to claim 2, wherein the method further comprises:
   displaying, on the second control settings interface, second expansion options that are in a one-to-one correspondence with the P second controls;
   detecting a fifth operation for the second expansion option;
   entering, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;
   detecting a sixth operation for the third configuration option;
   selecting, in response to detecting the sixth operation, at least one third control; and
   displaying, based on the mobile device being switched from the screen-on state to the AOD state, a control in the AOD theme as a part of at least one of the first controls, the second controls, and the third controls displayed in the screen-on theme.

6. The method according to claim 3, wherein the method further comprises:
   displaying, on the second control settings interface, second expansion options that are in a one-to-one correspondence with the P second controls;
   detecting a fifth operation for the second expansion option;
   entering, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;
   detecting a sixth operation for the third configuration option;
   selecting, in response to detecting the sixth operation, at least one third control; and
   displaying, based on the mobile device being switched from the screen-on state to the AOD state, a control in the AOD theme as a part of at least one of the first controls, the second controls, and the third controls displayed in the screen-on theme.

7. A mobile device, comprising:
   a processor; and
   a non-transitory computer-readable storage medium storing a program to be executed by the processor, the program including instructions to:
      detect a first operation for Always On Display (AOD) settings when the mobile device is under a screen-on theme;
      enter, in response to detecting the first operation, an AOD settings interface, wherein M first controls, and first configuration options that are in a one-to-one correspondence with the M first controls, are displayed on the AOD settings interface, wherein the M first controls are text based descriptions of discrete elements of the screen-on theme, wherein M is a positive integer greater than or equal to 1, wherein first expansion options that are in a one-to-one correspondence with N first controls are further displayed on the AOD settings interface, and wherein N is a positive integer greater than or equal to 1 and less than or equal to M;

detect a second operation for the first configuration option;

select, in response to detecting the second operation, at least one first control;

detect a third operation for the first expansion option;

enter, in response to detecting the third operation, a second control settings interface corresponding to one first control, wherein P second controls, and second configuration options that are in a one-to-one correspondence with the P second controls, are displayed on the second control settings interface, and wherein P is a positive integer greater than or equal to 1;

detect a fourth operation for the second configuration option;

select, in response to detecting the fourth operation, at least one second control; and display, based on the mobile device being switched from a screen-on state to an AOD state, a control in an AOD theme as a part of at least one of the first controls and the second controls displayed in the screen-on theme.

8. The mobile device according to claim 7, wherein the screen-on theme is a screen-on theme downloaded from a theme application on the mobile device, or a screen-on theme received from another mobile device, a computer, or a server.

9. The mobile device according to claim 7, wherein the screen-on theme of the mobile device is pre-stored by a mobile device vendor on the mobile device before delivery.

10. The mobile device according to claim 7, wherein the instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to detecting the sixth operation, at least one third control; and display, based on the mobile device being switched from the screen-on state to the AOD state, a control in the AOD theme as a part of at least one of the first controls, the second controls, and the third controls displayed in the screen-on theme.

11. The mobile device according to claim 8, wherein the instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to the sixth operation, at least one third control; and display, based on the mobile device being switched from the screen-on state to the AOD state, a control in the AOD theme as a part of at least one of the first controls, the second controls, and the third controls displayed in the screen-on theme.

12. The mobile device according to claim 9, wherein the instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to detecting the sixth operation, at least one third control; and display, based on the mobile device being switched from the screen-on state to the AOD state, a control in the AOD theme as a part of at least one of the first controls, the second controls, and the third controls displayed in the screen-on theme.

13. A non-transitory computer-readable storage medium comprising instructions, wherein, when the instructions are run on a mobile device, the mobile device is configured to perform:

detect a first operation for Always On Display (AOD) settings when the mobile device is under a screen-on theme;

enter, in response to detecting the first operation, an AOD settings interface, wherein M first controls, and first configuration options that are in a one-to-one correspondence with the M first controls, are displayed on the AOD settings interface, wherein the M first controls are text based descriptions of discrete elements of the screen-on theme, wherein M is a positive integer greater than or equal to 1, wherein first expansion options that are in a one-to-one correspondence with N first controls are further displayed on the AOD settings interface, and wherein N is a positive integer greater than or equal to 1 and less than or equal to M;

detect a second operation for the first configuration option;

select, in response to detecting the second operation, at least one first control;

detect a third operation for the first expansion option;

enter, in response to detecting the third operation, a second control settings interface corresponding to one first control, wherein P second controls, and second configuration options that are in a one-to-one correspondence with the P second controls, are displayed on the second control settings interface, and wherein P is a positive integer greater than or equal to 1;

detect a fourth operation for the second configuration option;

select, in response to detecting the fourth operation, at least one second control; and display, base on the mobile device being switched from a screen-on state to an AOD state, a control in an AOD theme as a part of at least one of the first controls and the second controls displayed in the screen-on theme.

14. The non-transitory computer-readable storage medium according to claim 13, wherein the screen-on theme is a screen-on theme downloaded from a theme application on the mobile device, or a screen-on theme received from another mobile device, a computer, or a server.

15. The non-transitory computer-readable storage medium according to claim 13, wherein the screen-on theme of the mobile device is pre-stored by a mobile device vendor on the mobile device before delivery.

16. The non-transitory computer-readable storage medium according to claim 13, wherein instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to detecting the sixth operation, at least one third control; and display, based on the mobile device being switched from the screen-on state to the AOD state, a control in the AOD theme as a part of at least one of the first controls, the second controls, and the third controls displayed in the screen-on theme.

17. The non-transitory computer-readable storage medium according to claim 14, wherein the instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to detecting the sixth operation, at least one third control; and display, based on the mobile device being switched from the screen-on state to the AOD state, a control in the AOD theme as a part of at least one of the first controls, the second controls, and the third controls displayed in the screen-on theme.

18. The non-transitory computer-readable storage medium according to claim 15, wherein the instructions include further instructions to:

display, on the second control settings interface, second expansion options that are in a one-to-one correspondence with the P second controls;

detect a fifth operation for the second expansion option;

enter, in response to detecting the fifth operation, a third control settings interface corresponding to one second control, wherein Q third controls, and third configuration options that are in a one-to-one correspondence with the Q third controls, are displayed on the third control settings interface, and wherein Q is a positive integer greater than or equal to 1;

detect a sixth operation for the third configuration option;

select, in response to detecting the sixth operation, at least one third control; and display, based on the mobile device being switched from the screen-on state to the AOD state, a control in the AOD theme as a part of at least one of the first controls, the second controls, and the third controls displayed in the screen-on theme.

\* \* \* \* \*